(12) United States Patent
Eguchi

(10) Patent No.: US 9,595,230 B2
(45) Date of Patent: Mar. 14, 2017

(54) DISPLAY DEVICE EQUIPPED WITH POWER GENERATION FUNCTION

(71) Applicant: Sharp Kabushiki Kaisha, Osaka-shi, Osaka (JP)

(72) Inventor: Makoto Eguchi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 100 days.

(21) Appl. No.: 14/412,751

(22) PCT Filed: Jul. 17, 2013

(86) PCT No.: PCT/JP2013/069341
§ 371 (c)(1),
(2) Date: Jan. 5, 2015

(87) PCT Pub. No.: WO2014/017341
PCT Pub. Date: Jan. 30, 2014

(65) Prior Publication Data
US 2015/0154923 A1    Jun. 4, 2015

(30) Foreign Application Priority Data

Jul. 24, 2012    (JP) .................................. 2012-164198

(51) Int. Cl.
G09G 3/34       (2006.01)
G06F 3/038     (2013.01)
G09G 5/00       (2006.01)
G02B 26/02     (2006.01)
H02N 1/00       (2006.01)
G09G 3/20       (2006.01)

(52) U.S. Cl.
CPC .......... *G09G 3/3433* (2013.01); *G02B 26/02* (2013.01); *G09G 3/20* (2013.01); *H02N 1/008* (2013.01); *G09G 2300/08* (2013.01); *G09G 2330/021* (2013.01); *G09G 2330/023* (2013.01)

(58) Field of Classification Search
CPC ............................. G09G 3/3433; G09G 3/3413
See application file for complete search history.

(56) References Cited

U.S. PATENT DOCUMENTS 6,842,170 B1 * 1/2005 Akins ............... G02F 1/133603
                                                                    178/18.01
2006/0127085 A1 * 6/2006 Matsuki ................. H02N 1/004
                                                                    396/483

(Continued)

FOREIGN PATENT DOCUMENTS

JP         2011-036089 A       2/2011

*Primary Examiner* — Alexander Eisen
*Assistant Examiner* — Nan-Ying Yang
(74) *Attorney, Agent, or Firm* — Keating & Bennett, LLP

(57) ABSTRACT

An MEMS shutter-type display device equipped with a power generation function, which achieves reduction of power consumption, is provided in the present invention. The display device equipped with a power generation function according to the present invention includes: a first substrate including a movable first shutter with a first slit, a first electrode, and a second electrode that is installed on the side opposite to the first electrode via the first shutter; a second substrate including a second shutter with a second slit; a drive circuit to actuate the first shutter; the first shutter being positively or negatively charged; and the drive circuit being connected to the first electrode.

8 Claims, 29 Drawing Sheets

(56) References Cited

U.S. PATENT DOCUMENTS

2006/0187191 A1\* 8/2006 Hagood ................. G02B 26/04
 345/109
2006/0250325 A1 11/2006 Hagood et al.
2007/0001936 A1\* 1/2007 Kawakami ........... G09G 3/3208
 345/76
2011/0007381 A1\* 1/2011 Paolini, Jr. .............. G02F 1/167
 359/296

\* cited by examiner

DISPLAY DEVICE EQUIPPED WITH POWER GENERATION FUNCTION

TECHNICAL FIELD

The present invention relates to a display device equipped with a power generation function. More specifically, the present invention relates to a shutter display which utilizes an MEMS (Micro Electro-Mechanical System) technique.

BACKGROUND ART

The MEMS technique has attracted much attention nowadays as a technique for producing fine electronic parts. For example, it has been studied to apply the MEMS technique to various electronic devices such as displays, power generation devices, and so forth (For example, see patent literature 1 or 2).

Examples of displays manufactured using the MEMS technique include MEMS shutter displays. The MEMS shutter display includes a very small shutter, which has been produced by the MEMS technique, for each pixel. The display is turned on or turned off by opening or closing the shutter to control the transmittance of light from the backlight or the like. The display device has some advantages, such as high efficiency of light utilization and low power consumption, due to the unnecessity of the polarizing plate, color filters, and so on, which are necessary for currently popular liquid crystal display devices.

CITATION LIST

Patent Literatures

Patent literature 1: US 2006/0250325 A
Patent literature 2: JP 2011-36089 A

SUMMARY OF INVENTION

Technical Problem

MEMS shutter displays are low in power consumption compared with liquid crystal displays. However, there is a room for more consideration to reduce power consumption in the MEMS shutter display.

Further, MEMS shutter displays and liquid crystal displays are common in that they both consume electric power. Thus, they both need external batteries or power generation devices to supply electric power to drive the displays.

The present invention has been made in view of the above state of the art. That is, it is an object of the present invention to provide an MEMS shutter-type display device equipped with a power generation function. The device can achieve reduction of power consumption and has a power generation function.

Solution to Problem

The present inventor has studied for searching a method to reduce power consumption of MEMS shutter displays, and focused on the driving principle of the display. The display performs a display by opening and closing the shutter at a high speed, and power consumption required for driving the shutter appears to be difficult to reduce. Thus, the present inventor has studied on another approach to reduce power consumption.

The present inventor has paid attention on the points that the shutter of the display is positively or negatively charged, and that the display performs a display by sliding the shutter from side to side. Also, he has found that electricity can be generated by utilizing the movement of the shutter.

Specifically, the present inventor has found a structure in which an electrode for generating electricity is installed at a position opposite to the shutter at a given interval. The present inventor has found that such a structure causes electrostatic induction when the shutter approaches the electrode for generating electricity when preforming the display, whereby the electrode for generating electricity is charged reversely to the polarity to the shutter. The present inventor has also found that the amount of the electric charge on the electrode for generating power electricity changes as the variation in the distance between the electrode for generating electricity and the shutter according to the movement of the shutter. Further, he has found that the electric current produced depending on the amount of the change of the electric charge can be taken from the electrode for generating electricity and be reused.

The above constitution enables utilization of the shutter drive not only for a display device, but also as a power generation mechanism. The electromotive force generated can be used, for example, for a part of a power source in the drive circuit. The power consumption can therefore be reduced as a whole display.

Thus, the present inventor can successfully solve the above problems, and has completed the present invention.

That is, an aspect of the present invention relates to a display device equipped with a power generation function (hereinafter also referred to as a first display device according to the present invention) including: a first substrate including a movable first shutter with a first slit, a first electrode, and a second electrode that is installed on the side opposite to the first electrode via the first shutter; a second substrate including a second shutter with a second slit; a drive circuit to actuate the first shutter; the first shutter being positively or negatively charged; and the drive circuit being connected to the first electrode.

The display device includes a first substrate and a second substrate. The first substrate includes a first shutter with a first slit, and the second substrate includes a second shutter with a second slit. The first shutter is movable, and is positively or negatively charged. Examples of the first shutter include electrets. The "electret" is intended to mean a dielectric which is permanently charged. The operation for charging a dielectric is called "electretization". In the display device, transmission and shielding of light from a light source is controlled according to the degree of overlapping between the first slit and the second slit.

The display device includes a first electrode and a second electrode. The first electrode is a site which is connected to the drive circuit, and at which a given electric potential is to be received. The first electrode serves to actuate the movable first shutter. The second electrode is used to supply a new electromotive force to the power source by utilizing the transfer of electric charges which is generated by the movement of the first shutter.

A specific example is described. When the first shutter is negatively charged, negative electrical potential, which has been supplied from the drive circuit to the first electrode, causes an electrostatic force (Coulomb's force) as a repulsive force between the first electrode and the shutter. The repulsive force moves the shutter in such a direction that shutter slides away from the first electrode. Here, the first shutter approaches the second electrode, which is installed with the first shutter at a given interval. This approach causes electrostatic induction, and positive charges thus gather on the second electrode, causing the transfer of electric charges (generating an electric current). Then, when the polarity of the electric potential which is supplied from the drive circuit to the first electrode is switched, the first shutter returns to the original position by a restoring force of an elastic body. Here, the movement of the first shutter to be away from the second electrode causes electrostatic induction on the second electrode. As a result, negative charges gather on the second electrode, causing the transfer of electric charges (generating an electric current).

When the first shutter is positively charged, negative electrical potential, which has been supplied from the drive circuit to the first electrode, causes an electrostatic force (Coulomb's force) as an attractive force between the first electrode and the shutter. The attractive force moves the shutter in such a direction that the shutter approaches the first electrode. Here, the first shutter slides away from the second electrode, which is installed with the first shutter at a given interval. This movement causes electrostatic induction, and thus positive charges gather on the second electrode, causing the transfer of electric charge (generating an electric current). Then, when the polarity of the electric potential which is supplied from the drive circuit to the first electrode is switched, the first shutter returns to the original position by a restoring force of an elastic body. Here, the first shutter approaches the second electrode. This approach causes electrostatic induction on the second electrode, and thus, negative charges gather on the second electrode, causing the transfer of electric charge (generating an electric current).

The configuration of the first display device according to the present invention is not particularly limited as long as it essentially includes such components. Thus, other components which may be commonly used in the other display device may be appropriately applied to the configuration.

The longitudinal direction of the first slit and the longitudinal direction of the second slit are preferably in parallel with each other. The shapes and the dimensions of the first slit and the second slit are not particularly limited as long as they are arranged such that the longitudinal directions of them should be in parallel with each other.

To summarize the above, it is preferred that the first shutter is moved with the aid of an electrostatic force generated between the first shutter and the first electrode. It is also preferred that electrostatic induction caused by the movement of the first shutter generates an electromotive force on the second electrode.

The second electrode is connected, for example, to the drive circuit. This enables the supply of the electromotive force generated on the second electrode to a power source in the drive circuit.

When the second electrode is connected to the drive circuit, it is preferred that the display device equipped with a power generation function further includes a rectifier circuit between the second electrode and the drive circuit. This enables an efficient supply of the electromotive force to the power source in the drive circuit since the rectifier circuit converts the electromotive force from alternating current to direct current.

The display device equipped with a power generation function may further include a light source. Displaying is controlled by adjusting the amount of the light emitted from the light source and passing through the display device by the first shutter and the second shutter. The second electrode may be connected to the light source. This enables supply of the electromotive force which is generated on the second electrode to the light source.

When the second electrode is connected to the light source, it is preferred that the display device equipped with a power generation function further includes a rectifier circuit between the second electrode and the light source. This enables an efficient supply of the electromotive force to the light source since the rectifier circuit converts the electromotive force from alternating current to direct current.

The display device equipped with a power generation function may further include an external battery. The second electrode may be connected to the external battery.

It is preferred that the second electrode and the external battery are connected in series, the external battery is connected to the drive circuit and/or the light source, and the external battery is a secondary battery. This configuration enables accumulation of the generated electromotive force in the secondary battery with the aid of the vibration from the outside of the display device (environmental vibration) even when the display device is turned off. Thus, it is possible to drive a display device without any power generation device for electric power supply.

When the second electrode and the external battery are connected in series, it is preferred that the display device equipped with a power generation function further includes a rectifier circuit between the second electrode and the external battery. This enables an efficient supply of the electromotive force which is generated on the second electrode to the power source.

According to the present invention, the above effect is similarly achieved even when the second shutter doubles as the second electrode.

That is, another aspect of the present invention relates to a display device equipped with a power generation function (hereinafter also referred to as a second display device according to the present invention) including: a first substrate including a movable first shutter with a first slit, and a first electrode; a second substrate including a second shutter with a second slit; a drive circuit to actuate the first shutter; the first shutter being positively or negatively charged; the second shutter doubling as a second electrode; and the drive circuit being connected to the first electrode.

The configuration of the second display device according to the present invention is not particularly limited as long as it essentially includes such components. Thus, other components which may be commonly used in the other display device may be appropriately applied to the configuration.

Examples of the preferred modes of the second display device according to the present invention include the same modes which were described above as preferred modes of the first display device according to the present invention. That is, the preferred modes of the second display device according to the present invention include the following modes:

(a) A mode in which the longitudinal direction of the first slit and the longitudinal direction of the second slit are in parallel with each other;
(b) A mode in which the first shutter is moved with the aid of an electrostatic force generated between the first shutter and the first electrode;
(c) A mode in which electrostatic induction caused by the movement of the first shutter generates an electromotive force on the second electrode;
(d) A mode in which the second electrode is connected to the drive circuit;

(e) A mode in which the display device equipped with a power generation function further includes a rectifier circuit between the second electrode and the drive circuit;

(f) A mode in which the display device equipped with a power generation function further includes a light source, and the amount of the light emitted from the light source and passing through the display device is adjusted by the first shutter and the second shutter;

(g) A mode in which the second electrode is connected to the light source;

(h) A mode in which the display device equipped with a power generation function further includes a rectifier circuit between the second electrode and the light source;

(i) A mode in which the display device equipped with a power generation function further includes an external battery, and the second electrode is connected to the external battery;

(j) A mode in which the second electrode and the external battery are connected in series, and the display device equipped with a power generation function further includes a rectifier circuit between the second electrode and the external battery; and (k) A mode in which the second electrode and the external battery are connected in series, the external battery is connected to the drive circuit and/or the light source, and the external battery is a secondary battery.

According to the present invention, the above effect is similarly achieved even when a third electrode is installed in addition to the second electrode. Installation of such double electrodes enables the supply of the electromotive force to both the drive circuit and the light source respectively via corresponding circuits, for example.

That is, still another aspect of the present invention relates to a display device equipped with a power generation function (hereinafter also referred to as a third display device according to the present invention) including: a first substrate including a movable first shutter with a first slit, a first electrode, and a second electrode that is installed on the side opposite to the first electrode via the first shutter; a second substrate including a second shutter with a second slit; a drive circuit to actuate the first shutter; the first shutter being positively or negatively charged; the second shutter doubling as a third electrode; and the drive circuit being connected to the first electrode.

The third electrode is used, for example, to supply a new electromotive force to the power source in the drive circuit by utilizing the transfer of electric charges which is caused by the movement of the first shutter in the same manner as the second electrode.

The configuration of the third display device according to the present invention is not particularly limited as long as it essentially includes such components. Thus, other components which may be commonly used in the other display device may be appropriately applied to the configuration.

Examples of the preferred modes of the third display device according to the present invention include the same modes which were described above as preferred modes of the first display device according to the present invention. That is, the preferred modes of the third display device according to the present invention include the following modes:

(l) A mode in which the longitudinal direction of the first slit and the longitudinal direction of the second slit are in parallel with each other;

(m) A mode in which the first shutter is moved with the aid of an electrostatic force generated between the first shutter and the first electrode;

(n) A mode in which electrostatic induction caused by the movement of the first shutter generates an electromotive force on the second electrode and the third electrode;

(o) A mode in which at least one of the second electrode and the third electrode is connected to the drive circuit;

(p) A mode in which the display device equipped with a power generation function further includes a rectifier circuit between the second electrode and the drive circuit, and further includes another rectifier circuit between the third electrode and the drive circuit;

(q) A mode in which the display device equipped with a power generation function further includes a light source, and the amount of the light emitted from the light source and passing through the display device is adjusted by the first shutter and the second shutter;

(r) A mode in which at least one of the second electrode and the third electrode is connected to the light source;

(s) A mode in which the display device equipped with a power generation function further includes a rectifier circuit between the second electrode and the light source, and further includes another rectifier circuit between the third electrode and the light source;

(t) A mode in which the display device equipped with a power generation function further includes an external battery (hereinafter also referred to as a first external battery), and the second electrode is connected to the first external battery;

(u) A mode in which the display device equipped with a power generation function further includes an external battery (hereinafter also referred to as a second external battery), and the third electrode is connected to the second external battery;

(v) A mode in which the second electrode and the first external battery are connected in series, and the display device equipped with a power generation function further includes a rectifier circuit between the second electrode and the first external battery;

(w) A mode in which the third electrode and the second external battery are connected in series, and the display device equipped with a power generation function further includes a rectifier circuit between the third electrode and the second external battery; and (x) A mode in which the display device equipped with a power generation function further includes an external battery (hereinafter also referred to as a third external battery), the second electrode and the third electrode are connected in parallel, the second and third electrodes and the third external battery are connected in series, the third external battery is connected to the drive circuit and/or the light source, and the third external battery is a secondary battery.

Advantageous Effects of Invention

According to the present invention, an MEMS shutter-type display device equipped with a power generation function, which achieves reduction of power consumption, is provided.

DESCRIPTION OF EMBODIMENTS

Figure 1:
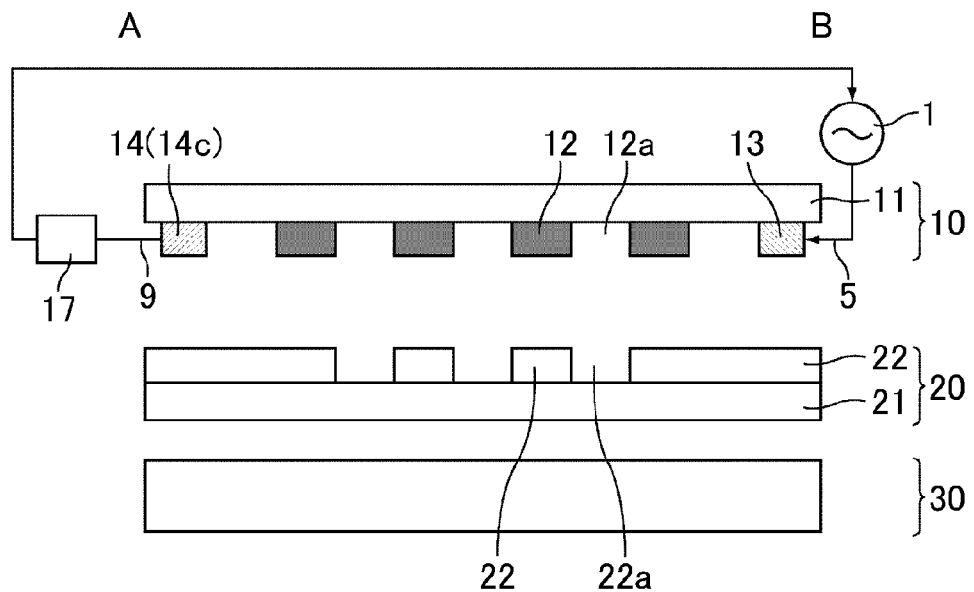
FIG. 1 is a schematic sectional view of one pixel in a display device according to the Embodiment 1.

The embodiments of the present invention will be described in more detail referring to the drawings. However, the present invention is not limited to these embodiments.

Embodiment 1

Figure 2:
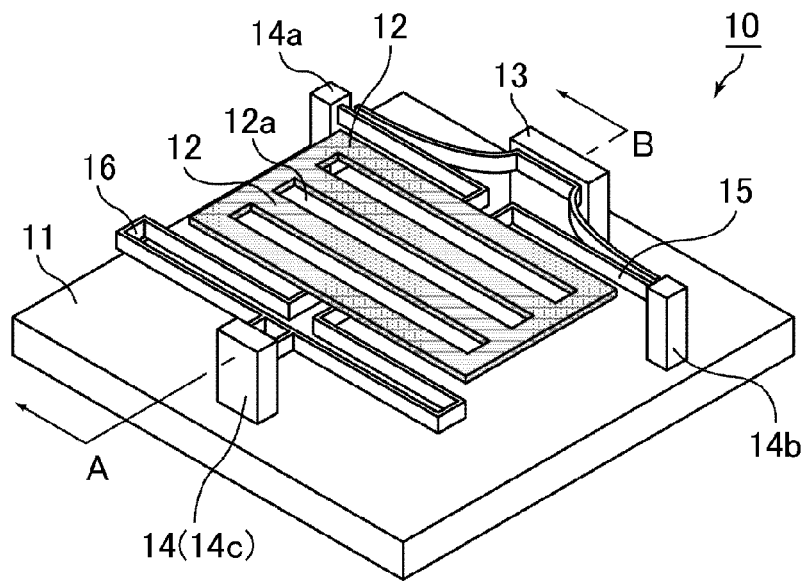
FIG. 2 is a schematic perspective view of one pixel of a first substrate which is illustrated in FIG. 1.
Figure 3:
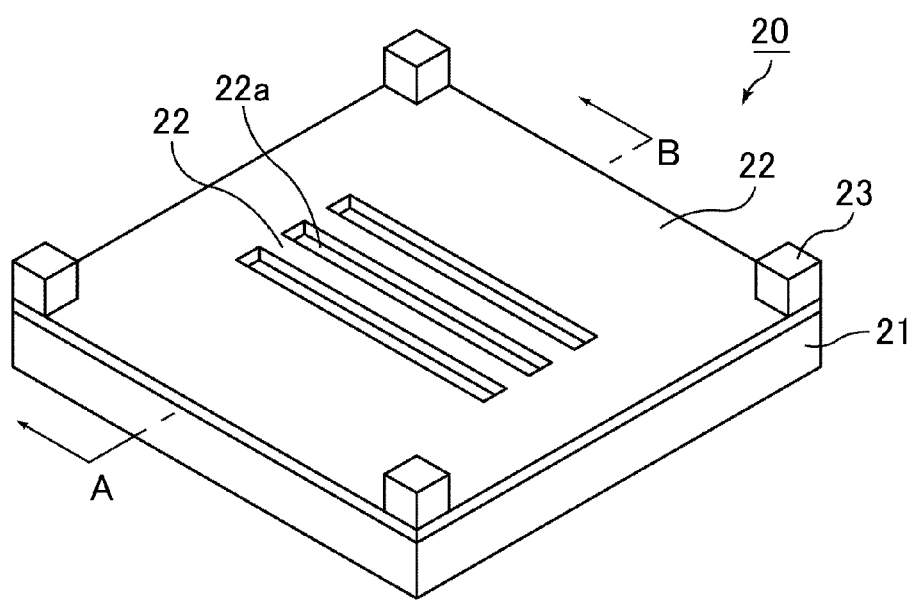
FIG. 3 is a schematic perspective view of one pixel of a second substrate which is illustrated in FIG. 1.
Figure 4:
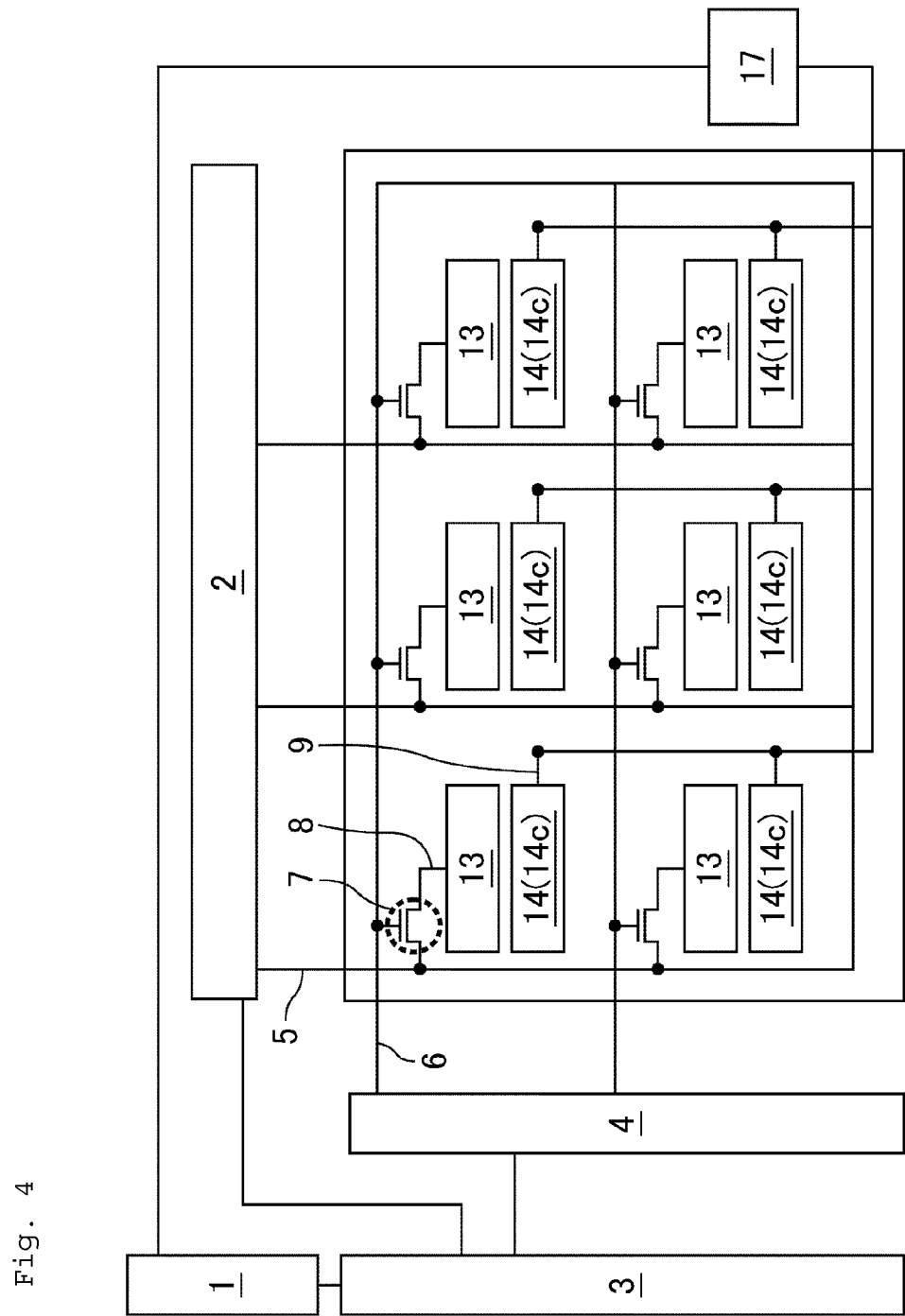
FIG. 4 is a view of a drive circuit in the display device according to the Embodiment 1.

FIG. 1 is a schematic sectional view of one pixel in a display device according to the Embodiment 1. FIG. 2 is a schematic perspective view of one pixel of a first substrate which is illustrated in FIG. 1. FIG. 3 is a schematic perspective view of one pixel of a second substrate which is illustrated in FIG. 1. The symbols "A" and "B" are common in FIGS. 1 to 3. FIG. 4 is a view of a drive circuit in the display device according to the Embodiment 1.

As illustrated in FIG. 1, the display device according to the Embodiment 1 includes a first substrate 10, a second substrate 20, and a backlight unit 30 in the stated order from the viewing surface side towards the back surface side. The first substrate 10 includes a shutter (first shutter) 12. The second substrate 20 includes a shutter (second shutter) 22. The shutter 12 is movable. During a non-display state, the shutter 12 overlaps a slit of the shutter 22 and shields light which is emitted from the backlight unit 30. During a display state, a slit of the shutter 12 overlaps the slit of the shutter 22. Thus light emitted from the backlight unit 30 passes through each of slits and outgoes as display light.

As illustrated in FIGS. 1 and 2, the first substrate 10 includes a transparent substrate 11, the shutter (first shutter) 12, a first electrode 13, and a plurality of supports 14 which support the shutter 12. The shutter 12 includes a plurality of slits (each slit constitutes the first slit) 12a therein. The periphery of the shutter 12 in a plan view is in a square (rectangular) shape.

In square planar shutter 12, one end on a side which is parallel with the longitudinal direction of the slit 12a is joined to two supports 14a and 14b via a first elastic body (a spring) 15. The other end on a side which is parallel with the longitudinal direction of the slit 12a in the shutter 12 is joined to a support 14c via a second elastic body (a spring) 16. The shutter 12 is reciprocatively movable in a horizontal direction with the aid of expansion and contraction of the first elastic body 15 and the second elastic body 16. The first electrode 13 is connected to a power source 1 in the drive circuit. The first electrode 13 is electrically isolated from the shutter 12. The support functions as a second electrode 14 in the Embodiment 1. The second electrode 14 is electrically connected to the power source 1 in the drive circuit via a charge electrode 9 and a rectifier circuit 17.

In FIG. 2, the support 14c, which is installed on the side opposite to the first electrode via the shutter, is used as the second electrode. Examples of materials for the second electrode 14 include aluminum (Al) and tungsten (W). Copper (Cu) or silver (Ag), which has low electrical resistance, may also be suitably used.

The shutter 12 is positively or negatively charged. For example, an electret may be used as the shutter 12. Electretization may be performed using, for example, corona discharge. Examples of the dielectric materials suitable for electretization include polymer materials such as Teflon (Registered trademark), polypropylene, and Mylar, and silicon oxide materials such as TEOS (Tetra Ethylene Oxy Silane) and SiOF (Fluorine-doped Silicon Oxide).

The shutter 12 may be made of a light shielding material, or dispersion of a light shielding ingredient, such as resinous BM, in a transparent material. When the shutter 12 has light shielding property, the transmittance of light emitted from the backlight unit 30 can be controlled.

The first elastic body 15 and the second elastic body 16 are not limited in shape as long as they are elastic. The first elastic body 15 and the second elastic body 16 may be made of an electroconductive material, or a dielectric material. Since the both ends of the shutter 12 are fixed via elastic bodies, slid shutter 12 can return to the original position by a restoring force of the elastic bodies, as will be described later.

The first electrode 13 is connected to a source driver of the drive circuit. Positive or negative electrical potential is supplied to the first electrode 13 from the power source 1. Thus, Coulomb's force is generated between the first electrode 13 and negatively-charged shutter 12. The shutter 12 can be moved parallelly in a horizontal direction by the generated Coulomb's force. Examples of materials for the first electrode 13 include, similarly to the second electrode 14, aluminum (Al) and tungsten (W). Copper (Cu) or silver (Ag), which has low electrical resistance, may also be suitably used.

As illustrated in FIGS. 1 and 3, the second substrate 20 includes a transparent substrate 21 and the shutter (second shutter) 22. The shutter 22 includes a plurality of slits (each slit constitutes the second slit) 22a therein.

The shutter 22 may be made of a light shielding material, or dispersion of a light shielding ingredient, such as resinous BM, in a transparent material, similarly to the shutter 12.

At four corners of a region (square) corresponding to one pixel of the second substrate, spacers 23 for separating the shutter 12 and the shutter 22 at given intervals are arranged.

The backlight unit 30 includes optical parts such as a light source, a light guide plate, and an optical sheet. The light source may suitably be one which can emit inherent light such as red, green, or blue light. Such light source enables highly efficient utilization of light because the color display can be performed even without color filters. Examples of the light source which can emit inherent light such as red, green, or blue light include light emitting diodes (LEDs). A combination of a white LED with a given color filter which is stacked on the white LED may also be used as an alternative. Other examples of light sources include a cold cathode fluorescent lamp (CCFL). When CCFL is used as a light source, color filters are necessary.

Now, a drive circuit in the display device according to the Embodiment 1 is described referring to FIG. 4. As illustrated in FIG. 4, the power source 1 is connected to a display controlling circuit 3 in the display device of the Embodiment 1. The display controlling circuit 3 is connected to a source driver 2 and a gate driver 4. A series of circuits to be used for display control, such as the power source 1, the display controlling circuit 3, the source driver 2, and the gate driver 4 correspond to the "drive circuit" according to the present invention. A plurality of source wirings 5 are drawn from the source driver 2. A plurality of gate wirings 6 are drawn from the gate driver 4. The source wirings 5 and the gate wirings 6 extend crosswise with each other. A region surrounded by the source wirings 5 and the gate wirings 6 defines one pixel. A TFT 7 is installed at each of intersections of source wirings 5 and gate wirings 6. A drain wiring 8 is drawn from the TFT 7. The drain wiring 8 is connected to the first electrode 13. The second electrode 14 provided for each pixel is connected to the charge electrode 9 which is common to all the pixels, and further connected to the power source 1 via the rectifier circuit 17.

The rectifier circuit 17 is a circuit which includes a commutator (a diode, for example). The rectifier circuit 17 installed between the second electrode 14 and the power source 1 enables an efficient supply of the electromotive force from the second electrode 14 to the power source 1.

The above configuration of the circuit enables utilization of an electromotive force which is generated by the movement of the shutter 12, used for a part of the power source 1.

Materials for various parts and method of producing them are described below.

The transparent substrates 11 and 21 are supporting substrates. It is suitable that they are made of a transparent insulating material such as glass and plastics.

The source wiring 5, the gate wiring 6, an electrode in the TFT 7, and the charge electrode 9 may be produced, for example, by sputtering a metal such as titanium (Ti), chromium (Cr), aluminum (Al), and molybdenum (Mo), or alloy thereof to form a film in a single layer or multilayers, and then patterning the film using, for example, a photolithographic method.

The shutter 12, the first electrode 13, the second electrode 14, the first elastic body 15, and the second elastic body 16 may be produced from the corresponding raw materials by an MEMS technique.

A display device according to the application is completed by first bonding the first substrate 10 and the second substrate 20 in which various parts are mounted, then packaging a gate driver, a source driver, a display controlling circuit, and the like, and finally combining a backlight unit.

Figure 5:
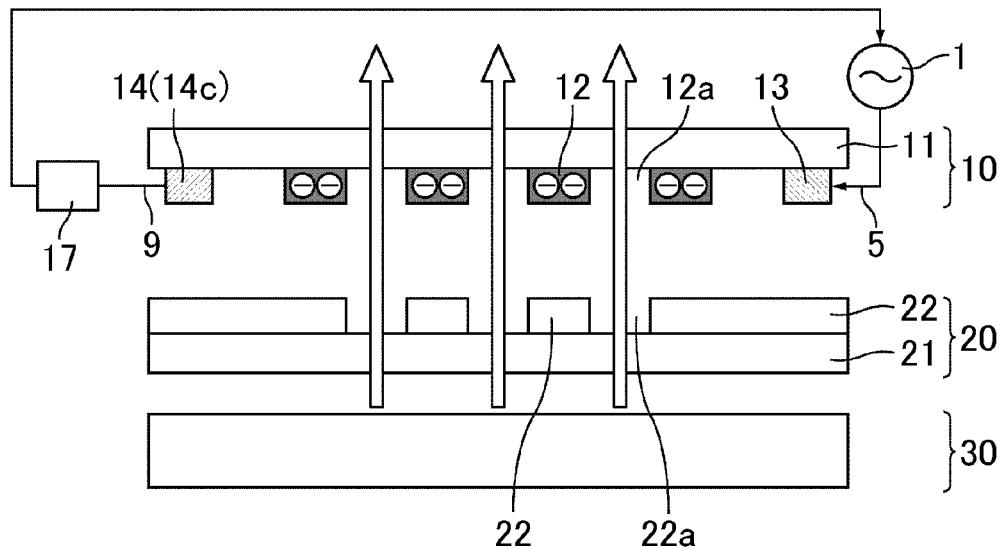
FIG. 5 is a schematic sectional view of one pixel in the display device according to the Embodiment 1 when no voltage is applied.
Figure 6:
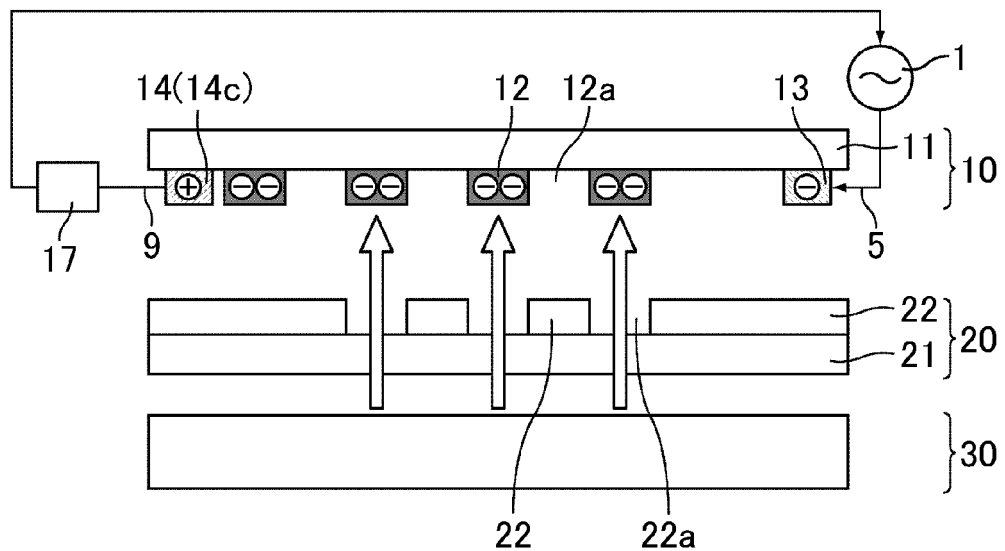
FIG. 6 is a schematic sectional view of one pixel in the display device according to the Embodiment 1 when negative voltage is applied.

Now, the driving process of the display device according to the Embodiment 1 is described referring to FIGS. 5 and 6. FIGS. 5 and 6 are both schematic sectional views of one pixel in the display device according to the Embodiment 1. FIG. 5 illustrates a state when no voltage is applied. FIG. 6 illustrates a state when negative voltage is applied.

When no voltage is applied, the slit 12a completely overlaps the slit 22a as illustrated in FIG. 5. Light emitted from the backlight unit 30 passes through the thus-overlapped slits 12a and 22a. As a result, the gray scale of the pixel shows a display state of the highest brightness (white color is displayed).

On the contrary, when negative electrical potential is supplied to the first electrode 13, Coulomb's force (repulsive force) is generated between the first electrode 13 and the shutter 12 as illustrated in FIG. 6. Then, as illustrated in FIG. 6, the shutter 12 slides away from the first electrode 13 in a horizontal direction (left direction in FIG. 6). The first elastic body 15 extends by being pulled by the shutter 12. When the shutter 12 completely overlaps the slit 22a, the shutter 12 shields light emitted from the backlight unit 30. As a result, the gray scale of the pixel shows a display state of the lowest brightness (black color is displayed).

When the shutter 12 slides in a left direction, the second electrode 14, which doubles a support for the shutter 12, approaches the shutter 12, and electrostatic induction is caused. The second electrode 14 is then charged reversely to the polarity of the shutter 12. In an embodiment as illustrated in FIG. 6, the shutter 12 is negatively charged. Therefore, the second electrode 14 is positively charged.

Then, when the polarity of the electric potential which is supplied to the first electrode 13 is switched, the shutter 12 returns to the original position by the restoring force of the first elastic body 15.

The amount of the electric charge on the second electrode 14 changes as the distance between the shutter 12 and the second electrode 14 varies, and thus electric current flows into the charge electrode 9. The charge electrode 9 is connected to the power source 1 in the drive circuit via the rectifier circuit 17 or the like. Thus, the electromotive force generated can be used for a part of the power source in the drive circuit.

The gray scale in the MEMS display is realized by controlling the transmittance of light based on the degree of overlap between the shutter 12 and the slit 22a, or by controlling the transmittance per unit time of light outgoing from the backlight by sliding the shutter 12 at a high speed. In the Embodiment 1, the gray scale may be realized by positively charging the shutter 12, and supplying positive electrical potential to the first electrode.

Figure 7:
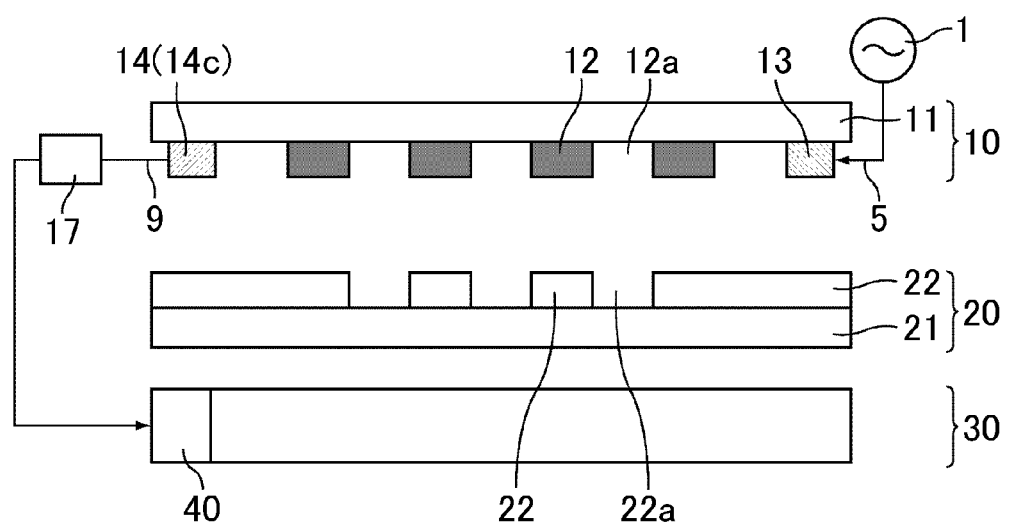
FIG. 7 is a schematic sectional view of one pixel in a display device according to the Modified Example 1.
Figure 8:
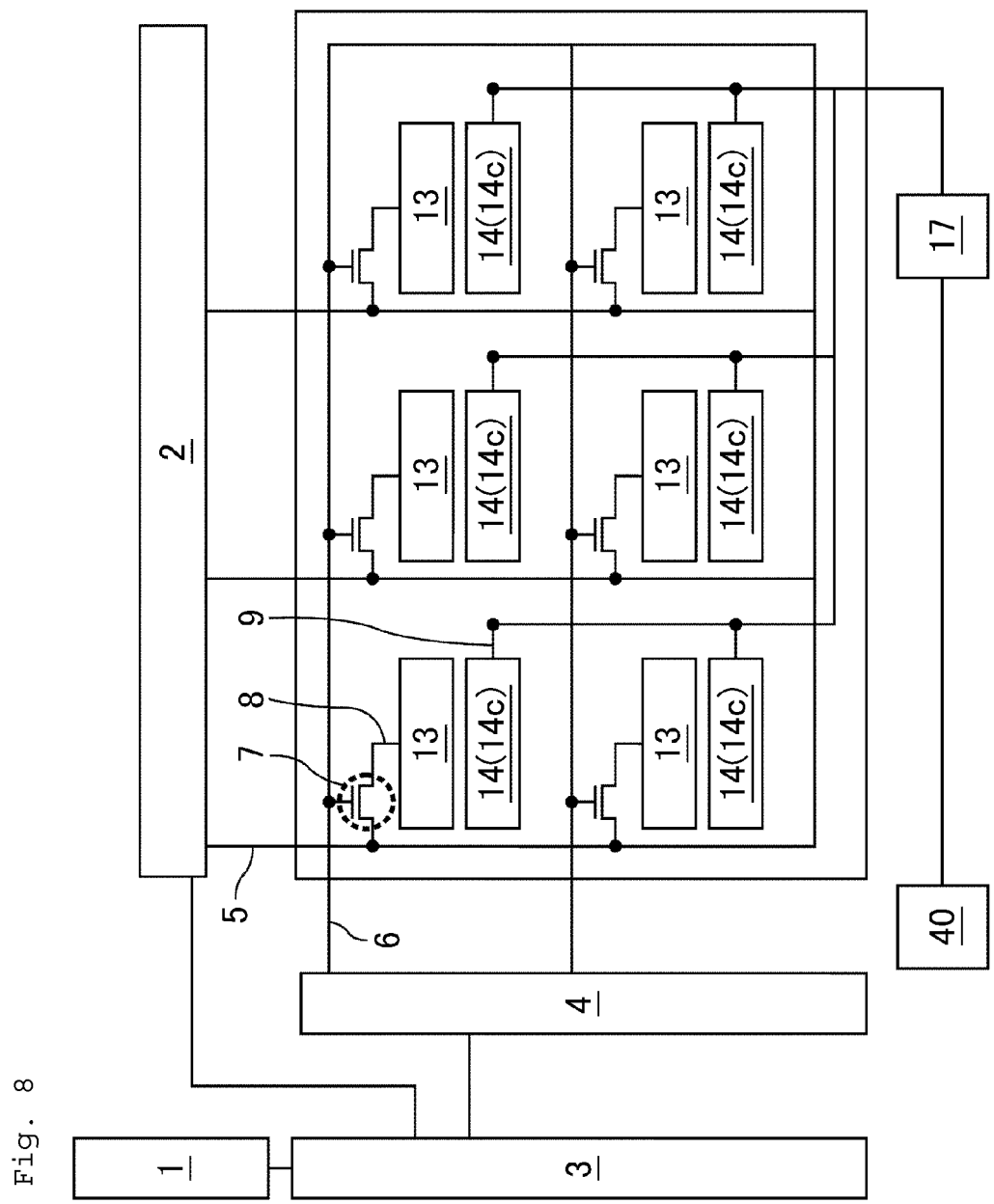
FIG. 8 is a view of a drive circuit in the display device according to the Modified Example 1.

A modified example of the Embodiment 1 in which the second electrode is connected to a light source (Modified Example 1) is now described as an example. FIG. 7 is a schematic sectional view of one pixel in a display device according to the Modified Example 1. FIG. 8 is a view of a drive circuit in the display device according to the Modified Example 1. As illustrated in FIGS. 7 and 8, the second electrode 14 is connected to a light source 40 in the backlight unit via the charge electrode 9 and the rectifier circuit 17. In the Modified Example 1, electromotive force which is generated by the movement of the first shutter can be used for a part of the light source.

Thus, in the Embodiment 1, the shutter 12 slides side to side as illustrated in FIGS. 5 and 6 in response to the switch of the polarity of the electric potential which is supplied to the first electrode, and therefore displaying and power generation can be performed simultaneously. The electromotive force generated can be used for a part of the power source in the drive circuit and/or for a part of the light source. The power consumption can therefore be reduced as a whole display device.

Embodiment 2

Figure 9:
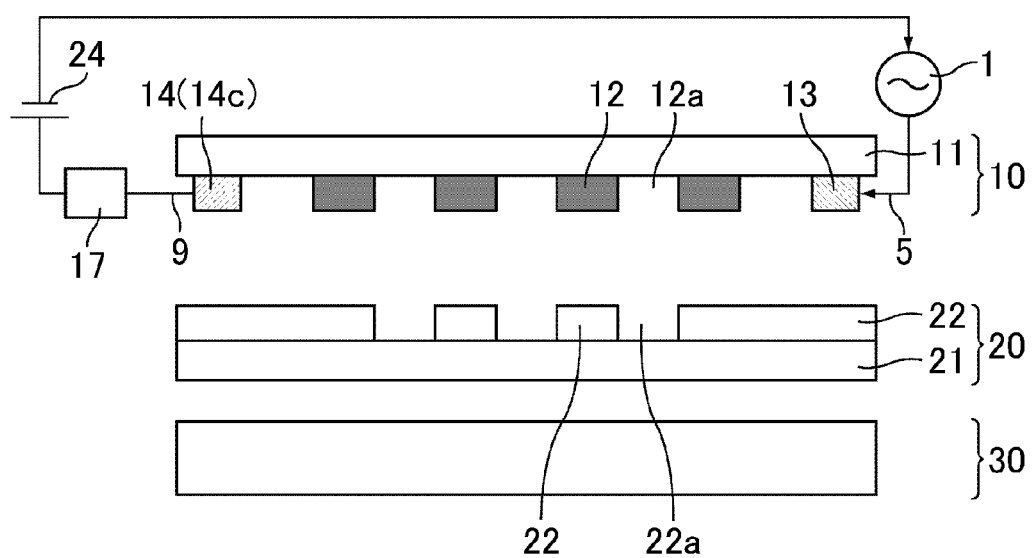
FIG. 9 is a schematic sectional view of one pixel in a display device according to the Embodiment 2.
Figure 10:
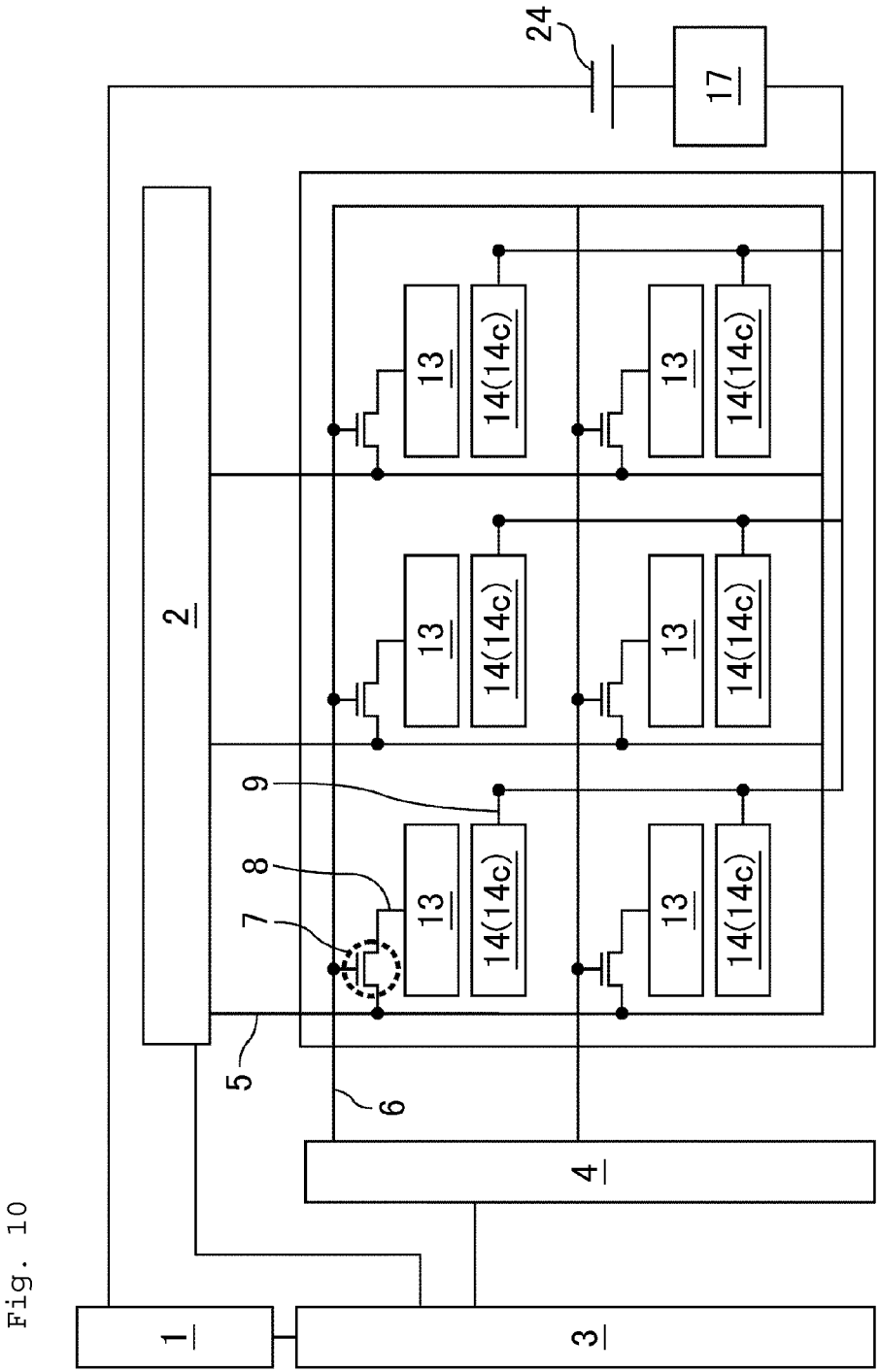
FIG. 10 is a view of a drive circuit in the display device according to the Embodiment 2.

In the Embodiment 2, an external battery is installed. The second electrode and the external battery are connected in series, and the external battery is a secondary battery. Other than these features, the Embodiment 2 is the same as the Embodiment 1. FIG. 9 is a schematic sectional view of one pixel in a display device according to the Embodiment 2. FIG. 10 is a view of a drive circuit in the display device according to the Embodiment 2.

As illustrated in FIGS. 9 and 10, the second electrode 14, the charge electrode 9, the rectifier circuit 17, an external battery 24, and the power source 1 are connected in series in the stated order in the display device according to the Embodiment 2. A secondary battery is used as the external battery 24. The type of the secondary battery is not particularly limited.

Displaying by the display device according to the Embodiment 2 is performed by controlling the transmittance of light according to the movement of the shutter 12, in the same manner as the Embodiment 1. Electrical power is generated with the aid of the movement of the shutter 12, contributing to lower power consumption. Further in the display device according to the Embodiment 2, the external battery can be charged with the aid of the vibration from the outside of the display device (environmental vibration) when the display device is turned off. Specifically, the shutter 12 slides with the aid of environmental vibrations to cause electrostatic induction. Electric charge is thereby supplied to the external battery 24 via the second electrode 14, the charge electrode 9, and the rectifier circuit 17. Thus, the external battery 24 can be charged. The electric charge accumulated in the external battery can be used as it is as an electromotive force in the power source in the drive circuit when the display device is turned on.

Figure 11:
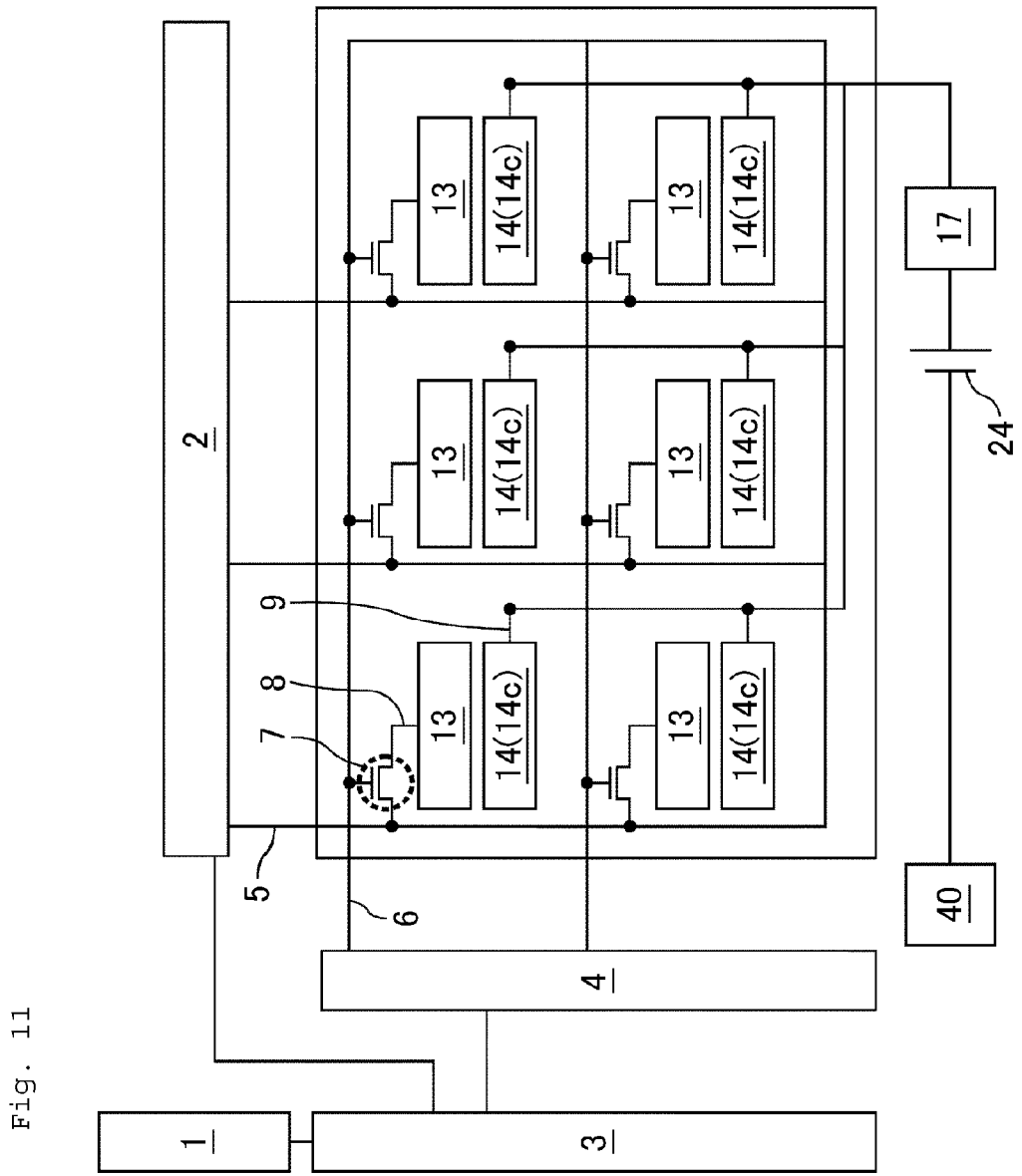
FIG. 11 is a view of a drive circuit in a display device according to the Modified Example 2.

A modified example of the Embodiment 2 in which the second electrode is connected to the light source (Modified Example 2) is now described as an example. FIG. 11 is a view of a drive circuit in a display device according to the Modified Example 2. As illustrated in FIG. 11, the second electrode 14, the charge electrode 9, the rectifier circuit 17, the external battery 24 and the light source 40 in the backlight unit are connected in series in the stated order in the Modified Example 2. The external battery can be charged with the aid of the vibration from the outside of the display device (environmental vibration) when the display device is turned off. The electric charge accumulated in the external battery can be used as it is as an electromotive force in the light source when the display device is turned on.

Thus, in the Embodiment 2, the first shutter slides side to side in response to the switch of the polarity of the electric potential which is supplied to the first electrode, and therefore displaying and power generation can be performed simultaneously, in the same manner as the Embodiment 1. According to the Embodiment 2, the external battery is charged in a non-display state, and thus-charged electric power can be used for a part of the power source in the drive circuit and/or for a part of the light source. The power consumption can therefore be reduced as a whole display device more efficiently.

Embodiment 3

Figure 12:
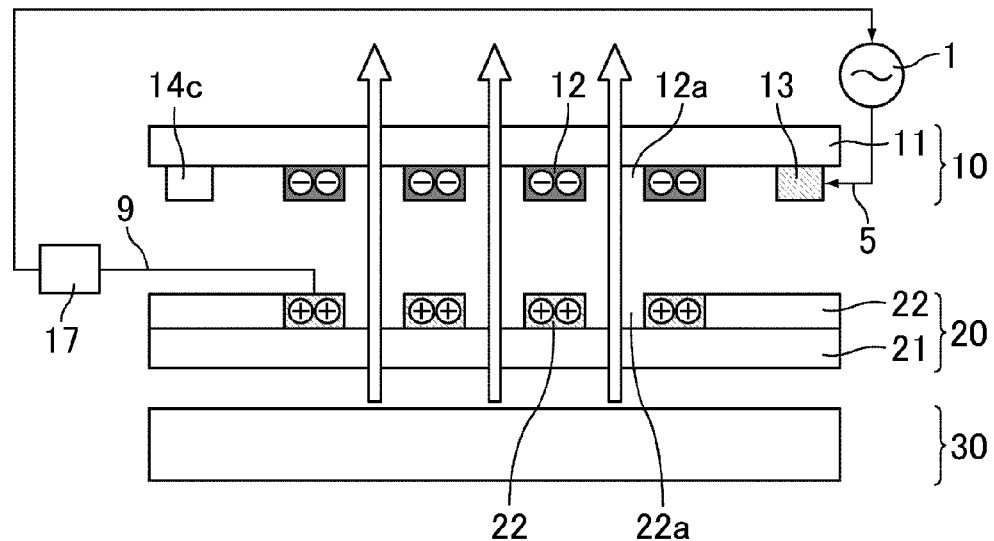
FIG. 12 is a schematic sectional view of one pixel in a display device according to the Embodiment 3 when no voltage is applied.
Figure 13:
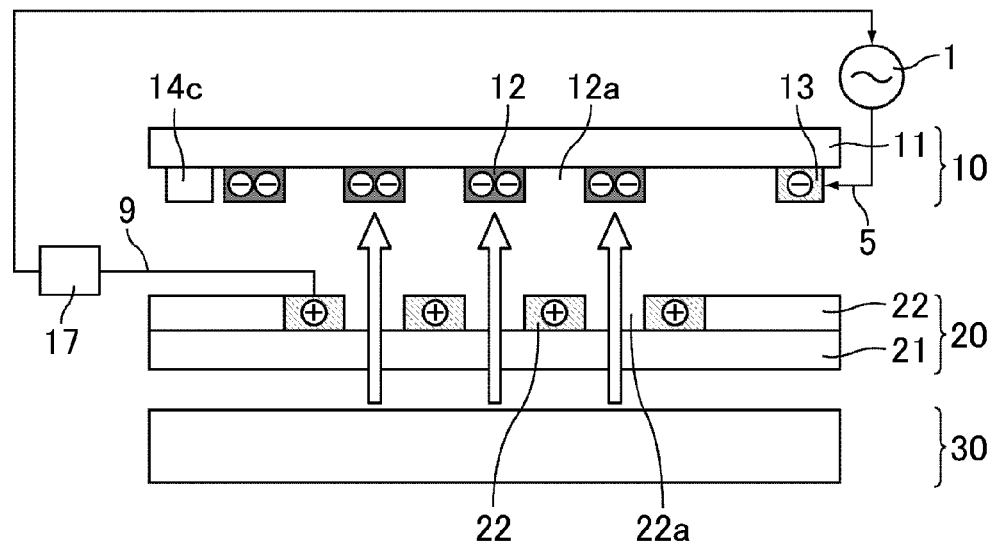
FIG. 13 is a schematic sectional view of one pixel in the display device according to the Embodiment 3 when negative voltage is applied.
Figure 14:
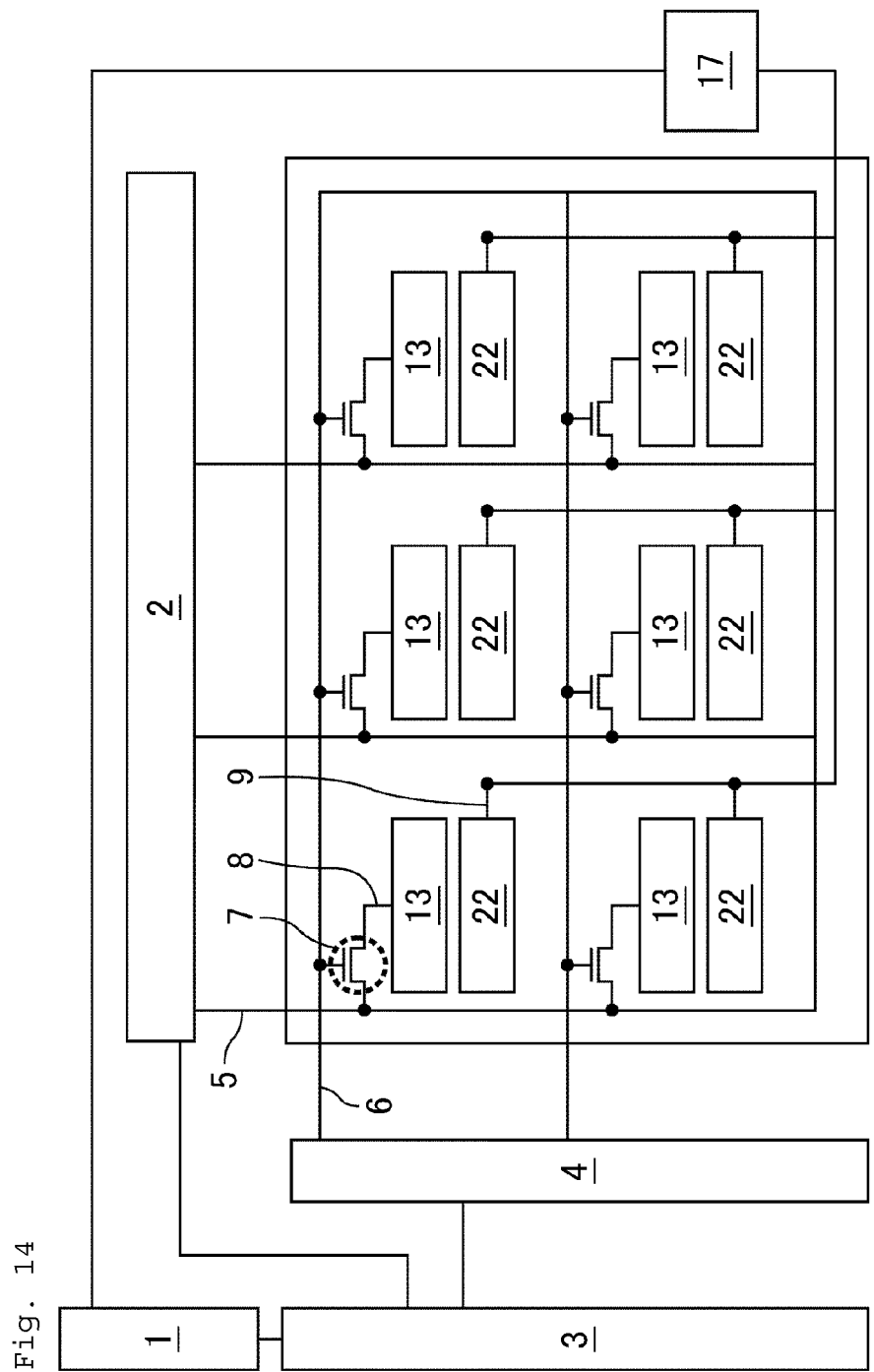
FIG. 14 is a view of a drive circuit in the display device according to the Embodiment 3.

The Embodiment 3 is the same as the Embodiment 1 except that the second shutter doubles as the second electrode in place of the support for a first shutter. FIGS. 12 and 13 are both schematic sectional views of one pixel in a display device according to the Embodiment 3. FIG. 12 illustrates a state when no voltage is applied. FIG. 13 illustrates a state when negative voltage is applied. FIG. 14 is a view of a drive circuit in the display device according to the Embodiment 3. In the Embodiment 3, the second shutter 22 is connected to the charge electrode 9 as illustrated in FIGS. 12 to 14, and functions as a second electrode. The charge electrode 9 is connected to the power source 1 in the drive circuit via the rectifier circuit 17.

Now, the driving process of the display device according to the Embodiment 3 is described referring to FIGS. 12 and 13. The basic principle of display is the same as in the Embodiment 1. When no voltage is applied, the slit 12a completely overlaps the slit 22a as illustrated in FIG. 12. Light emitted from the backlight unit 30 passes through the thus-overlapped slits 12a and 22a. As a result, the gray scale of the pixel shows a display state of the highest brightness (white color is displayed).

On the contrary, when negative electrical potential is supplied to the first electrode 13 from the power source 1, Coulomb's force (repulsive force) is generated between the first electrode 13 and the shutter 12 as illustrated in FIG. 13. Then, the shutter 12 slides away from the first electrode 13 in a horizontal direction (left direction in FIG. 13). The first elastic body 15 extends by being pulled by the shutter 12. When the shutter 12 completely overlaps the slit 22a, the shutter 12 shields light emitted from the backlight unit 30. As a result, the gray scale of the pixel shows a display state of the lowest brightness (black color is displayed).

When the shutter 12 slides in a left direction, the first shutter 12 goes apart from the second electrode 22, which doubles as the second shutter, and electrostatic induction is caused. Thus, positive electric charge on the second electrode 22 decreases by the electrostatic induction.

Then, when the polarity of the electric potential which is supplied to the first electrode 13 is switched, the shutter 12 returns to the original position by the restoring force of the first elastic body 15. The amount of the electric charge on the second electrode 22 changes as the distance between the shutter 12 and the second electrode 22 varies, and thus electric current flows into the charge electrode 9. The charge electrode 9 is connected to the power source 1 in the drive circuit via the rectifier circuit 17. Thus, the electromotive force generated can be used for a part of the power source in the drive circuit.

Figure 15:
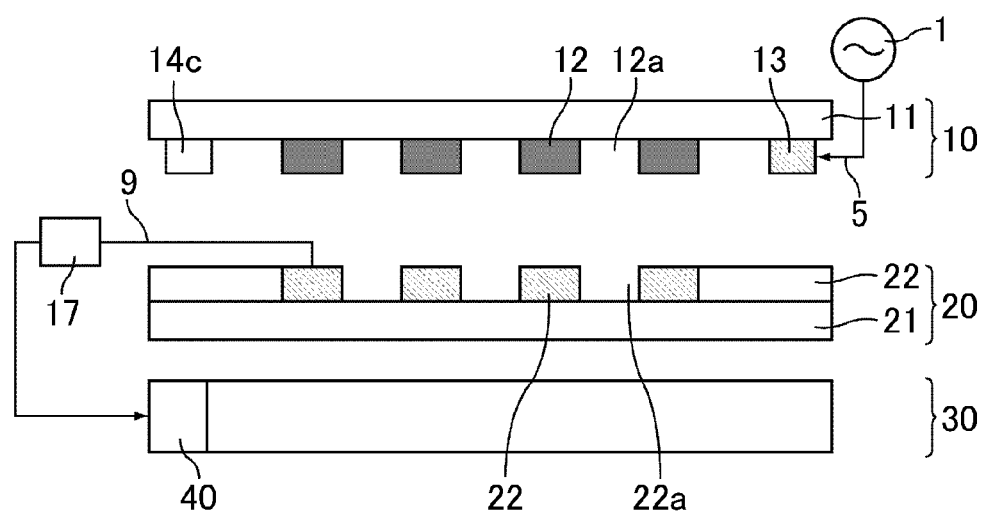
FIG. 15 is a schematic sectional view of one pixel in a display device according to the Modified Example 3.
Figure 16:
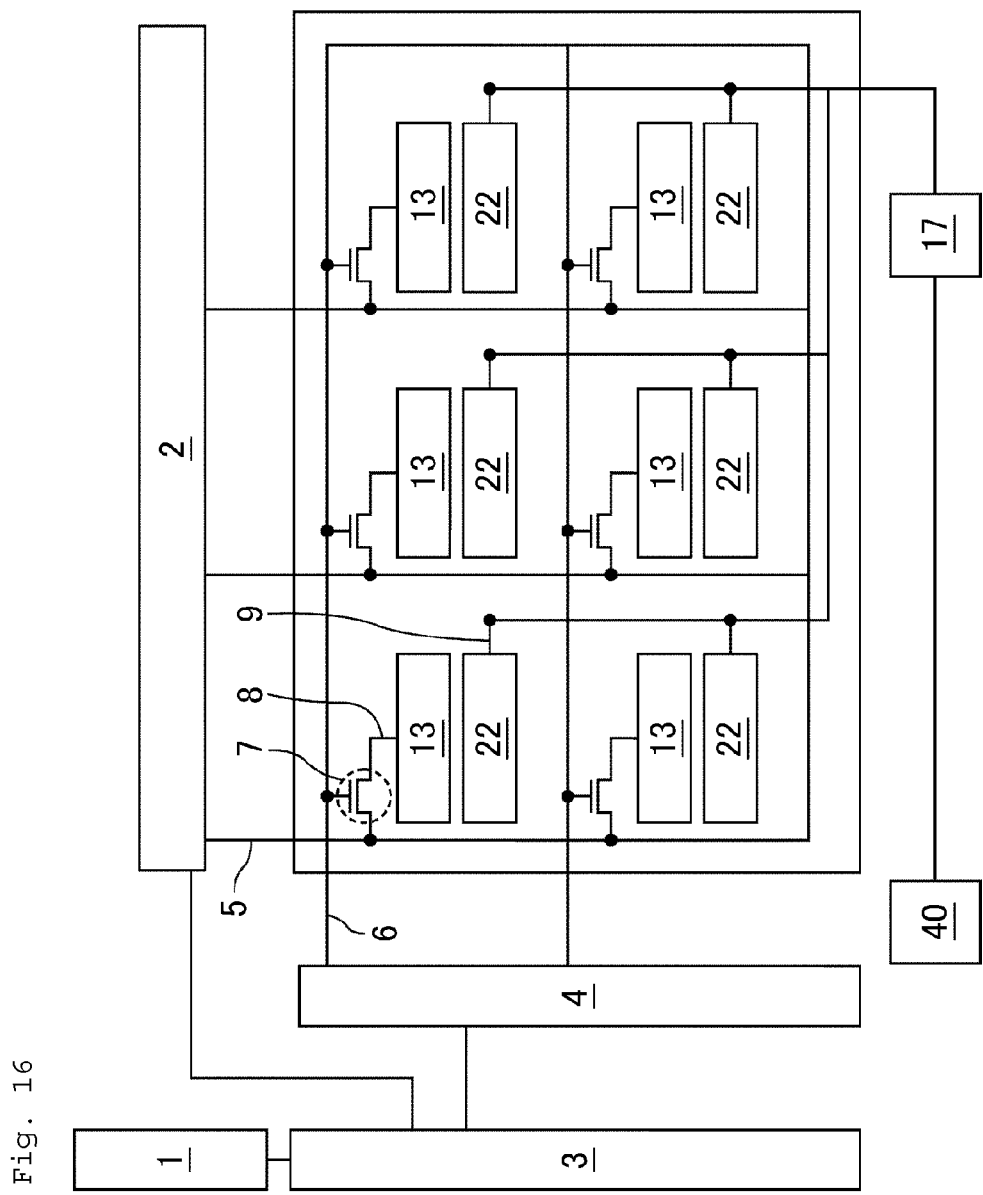
FIG. 16 is a view of a drive circuit in the display device according to the Modified Example 3.

A modified example of the Embodiment 3 in which the second electrode is connected to the light source (Modified Example 3) is now described as an example. FIG. 15 is a schematic sectional view of one pixel in a display device according to the Modified Example 3. FIG. 16 is a view of a drive circuit in the display device according to the Modified Example 3. As illustrated in FIGS. 15 and 16, the second electrode 22 is connected to the light source 40 in the backlight unit via the charge electrode 9 and the rectifier circuit 17. In the Modified Example 4, the electromotive force which is generated by the movement of the first shutter can be used for a part of the light source.

Thus, in the Embodiment 3, the first shutter slides side to side in response to the switch of the polarity of the electric potential which is supplied to the first electrode, and therefore displaying and power generation can be performed simultaneously, in the same manner as the Embodiment 1. The electromotive force generated can be used for a part of the power source in the drive circuit and/or for a part of the light source. The power consumption can therefore be reduced as a whole display device.

Embodiment 4

Figure 17:
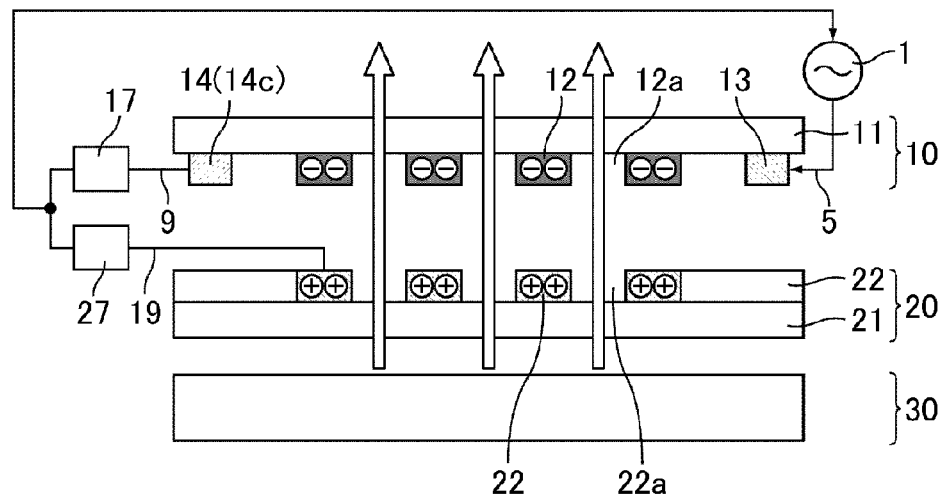
FIG. 17 is a schematic sectional view of one pixel in a display device according to the Embodiment 4 when no voltage is applied.
Figure 18:
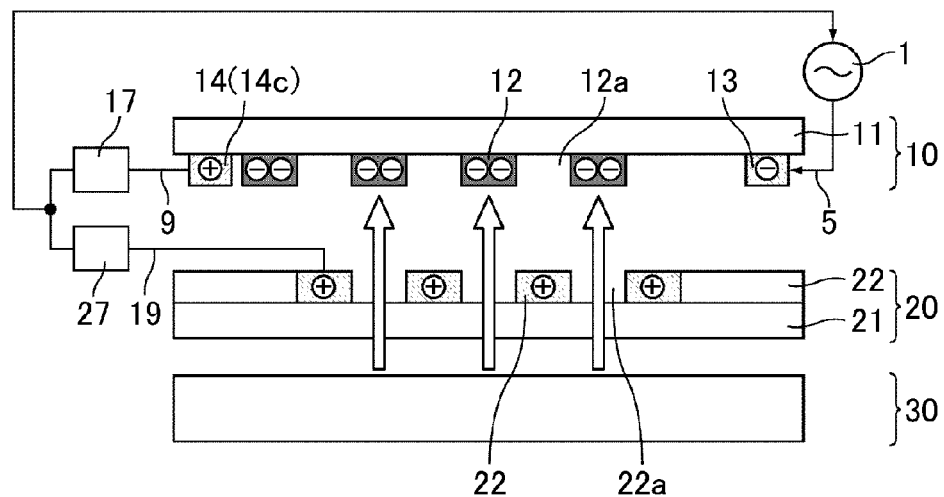
FIG. 18 is a schematic sectional view of one pixel in the display device according to the Embodiment 4 when negative voltage is applied.
Figure 19:
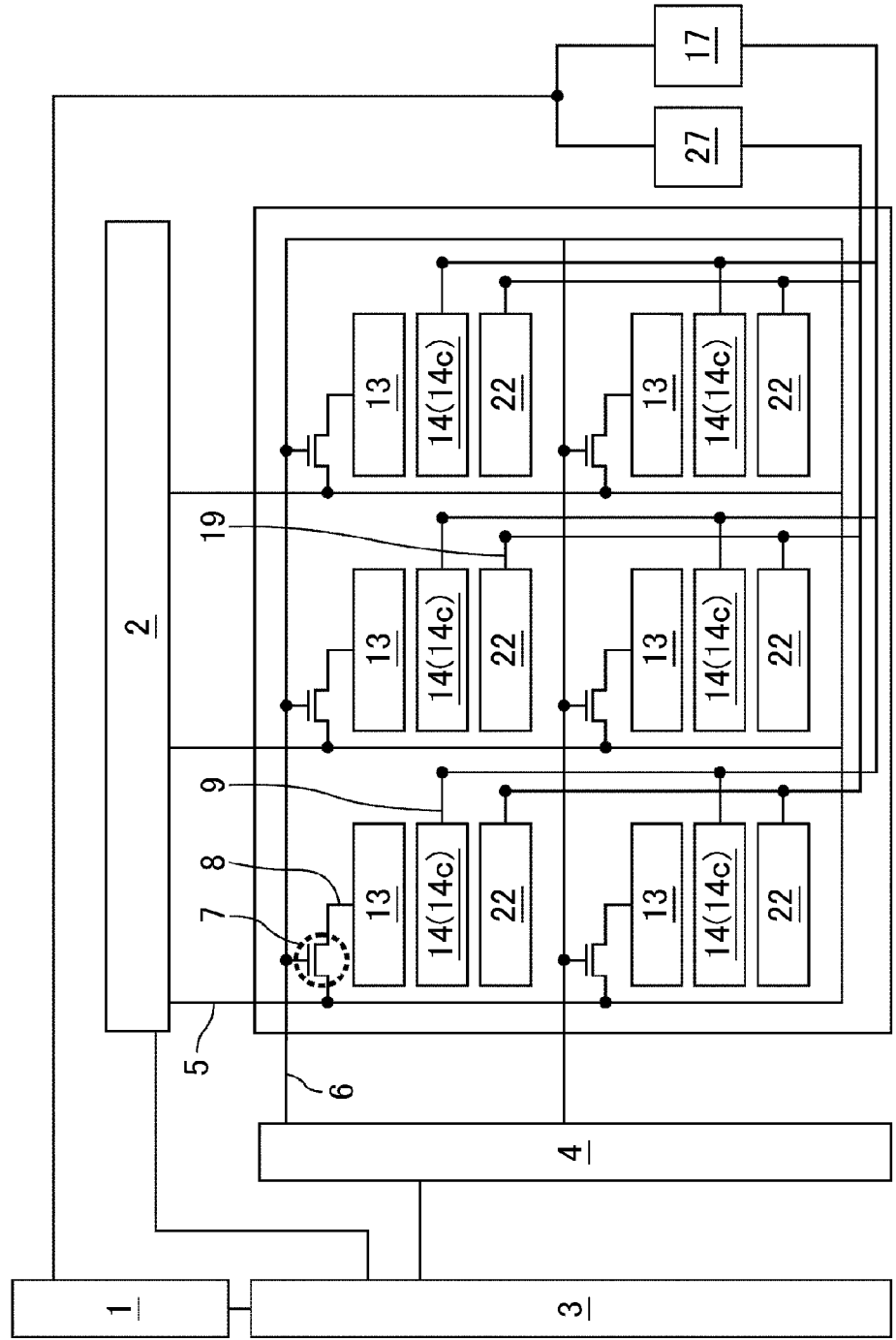
FIG. 19 is a view of a drive circuit in the display device according to the Embodiment 4.

The Embodiment 4 is the same as the Embodiment 1 except that a third electrode is installed in addition to the second electrode. FIGS. 17 and 18 are both schematic sectional views of one pixel in a display device according to the Embodiment 4. FIG. 17 illustrates a state when no voltage is applied. FIG. 18 illustrates a state when negative voltage is applied. FIG. 19 is a view of a drive circuit in the display device according to the Embodiment 4.

In the Embodiment 4, the support 14c is connected to the charge electrode 9 as illustrated in FIGS. 17 to 19, and functions as the second electrode. The second shutter 22 is connected to a charge electrode 19, and functions as a third electrode. The charge electrode 9 is connected to the power source 1 in the drive circuit via the rectifier circuit 17. The charge electrode 19 is connected to the power source 1 in the drive circuit via a rectifier circuit 27.

Now, the driving process of the display device according to the Embodiment 4 is described referring to FIGS. 17 and 18. The basic principle of display is the same as in the Embodiment 1. When no voltage is applied, the slit 12a completely overlaps the slit 22a as illustrated in FIG. 17. Light emitted from the backlight unit 30 passes through the thus-overlapped slits 12a and 22a. As a result, the gray scale of the pixel shows a display state of the highest brightness (white color is displayed).

On the contrary, when negative electrical potential is supplied to the first electrode 13 from the power source 1, Coulomb's force (repulsive force) is generated between the first electrode 13 and the shutter 12 as illustrated in FIG. 18. Then, the shutter 12 slides away from the first electrode 13 in a horizontal direction (left direction in FIG. 18). The first elastic body 15 extends by being pulled by the shutter 12. When the shutter 12 completely overlaps the slit 22a, the shutter 12 shields light emitted from the backlight unit 30. As a result, the gray scale of the pixel shows a display state of the lowest brightness (black color is displayed).

When the shutter 12 slides in a left direction, the second electrode 14, which doubles a support for the shutter 12, approaches the shutter 12, and electrostatic induction is caused. The second electrode 14 is then charged reversely to the polarity of the shutter 12. Also, the first shutter 12 goes apart from the third electrode 22, which doubles as the second shutter, and electrostatic induction is caused. Thus, positive electric charge on the second electrode 22 decreases by the electrostatic induction.

Then, when the polarity of the electric potential which is supplied to the first electrode 13 is switched, the shutter 12 returns to the original position by the restoring force of the first elastic body 15. The amount of the electric charge on the second electrode 14 changes as the distance between the shutter 12 and the second electrode 14 varies, and thus electric current flows into the charge electrode 9. The amount of the electric charge on the second electrode 22 changes as the distance between the shutter 12 and the third electrode 22 varies, and thus electric current flows into the charge electrode 19. The charge electrode 9 is connected to the power source 1 in the drive circuit via the rectifier circuit 17. The charge electrode 19 is connected to the power source 1 in the drive circuit via the rectifier circuit 27. Thus, the electromotive force generated can be used for a part of the power source in the drive circuit.

Figure 20:
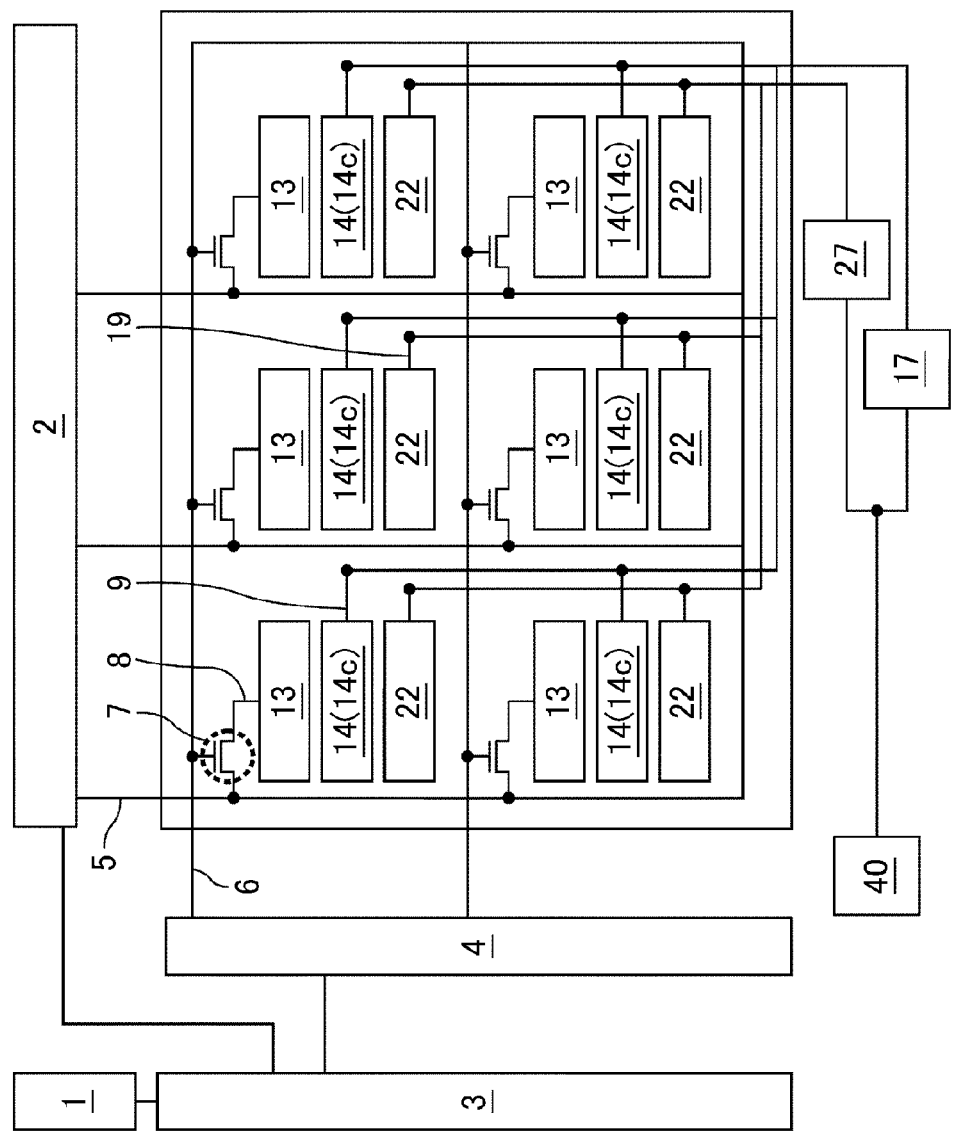
FIG. 20 is a view of a drive circuit in a display device according to the Modified Example 4-1.

A modified example of the Embodiment 4 in which the second electrode and the third electrode are each connected to the light source (Modified Example 4-1) is now described as an example. FIG. 20 is a view of a drive circuit in a display device according to the Modified Example 4-1. As illustrated in FIG. 20, the second electrode 14 is connected to the light source via the charge electrode 9 and the rectifier circuit 17 in the Modified Example 4-1. The third electrode 22 is connected to the light source via the charge electrode 19 and the rectifier circuit 27. In the Modified Example 4-1, the electromotive force which is generated by the movement of the first shutter can be used for a part of the light source.

Figure 21:
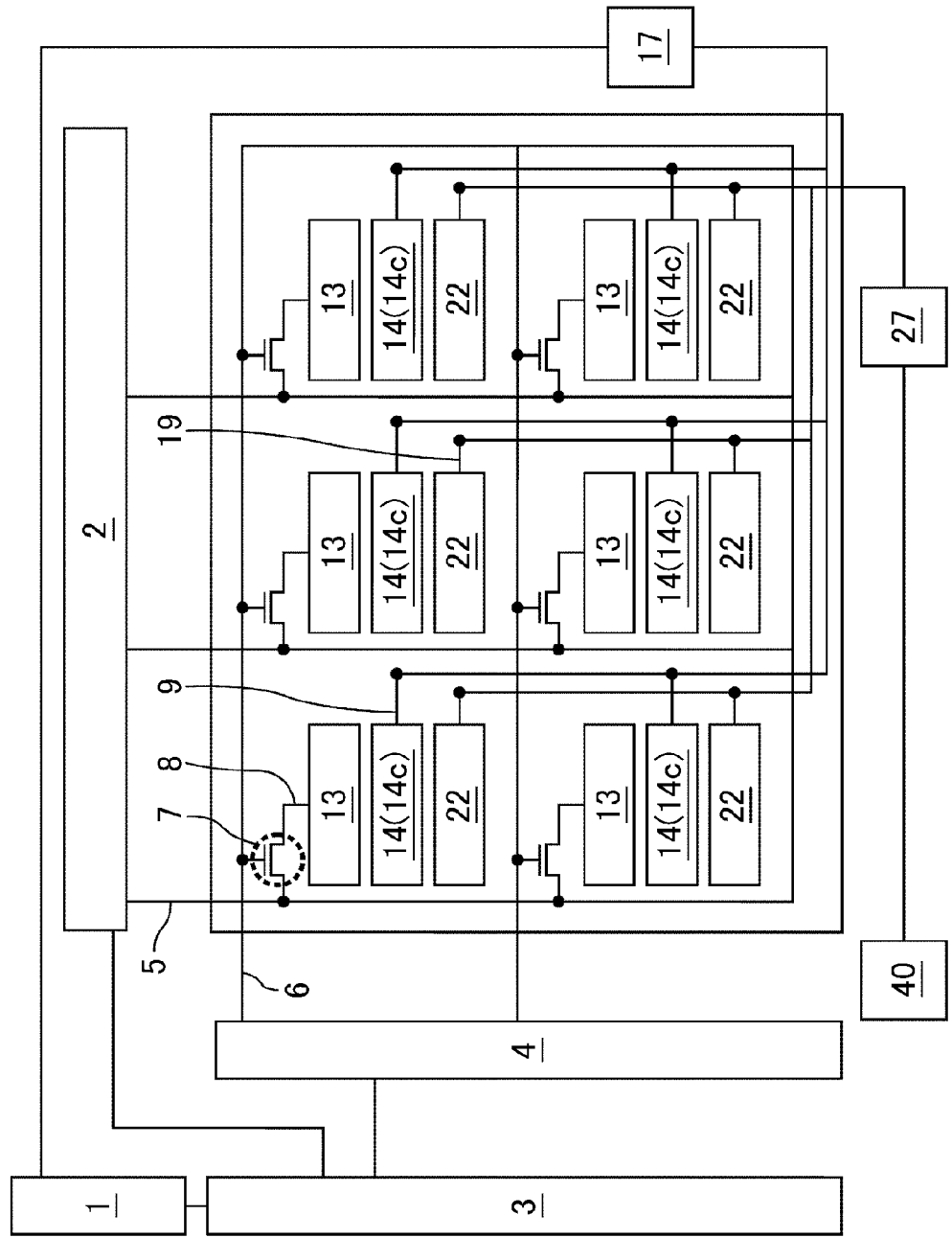
FIG. 21 is a view of a drive circuit in a display device according to the Modified Example 4-2.

Another modified example of the Embodiment 4, in which either one of the second electrode and the third electrode is connected to the power source in the drive circuit, and the other is connected to the light source (Modified Example 4-2), is now described as an example. FIG. 21 is a view of a drive circuit in a display device according to the Modified Example 4-2. As illustrated in FIG. 21, the second electrode 14 is connected to the power source 1 in the drive circuit via the charge electrode 9 and the rectifier circuit 17 in the Modified Example 4-2. The third electrode 22 is connected to the light source 40 via the charge electrode 19 and the rectifier circuit 27. In the Modified Example 4-2, the second electrode 14 may be connected to the light source 40, and the third electrode 22 may be connected to the power source 1 in the drive circuit.

In the Modified Example 4-2, the electromotive force which is generated by the movement of the first shutter can be used in the power source in the drive circuit and the light source.

Thus in the Embodiment 4, the shutter 12 slides side to side, as illustrated in FIGS. 17 and 18, in response to the switch of the polarity of the electric potential which is supplied to the first electrode, and therefore displaying and power generation can be performed simultaneously. Further in the Embodiment 4, both of the second electrode and the third electrode can supply a new electromotive force to the power source in the drive circuit and/or the light source by utilizing the transfer of electric charges which is caused by the movement of the first shutter. The power consumption can therefore be more reduced as a whole power generation display device.

Embodiment 5

Figure 22:
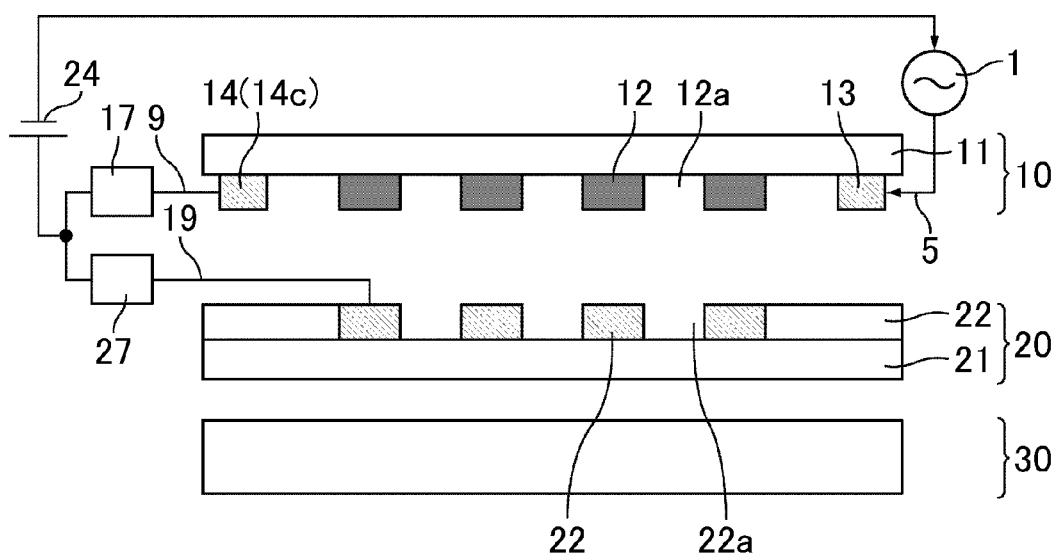
FIG. 22 is a schematic sectional view of one pixel in a display device according to the Embodiment 5.
Figure 23:
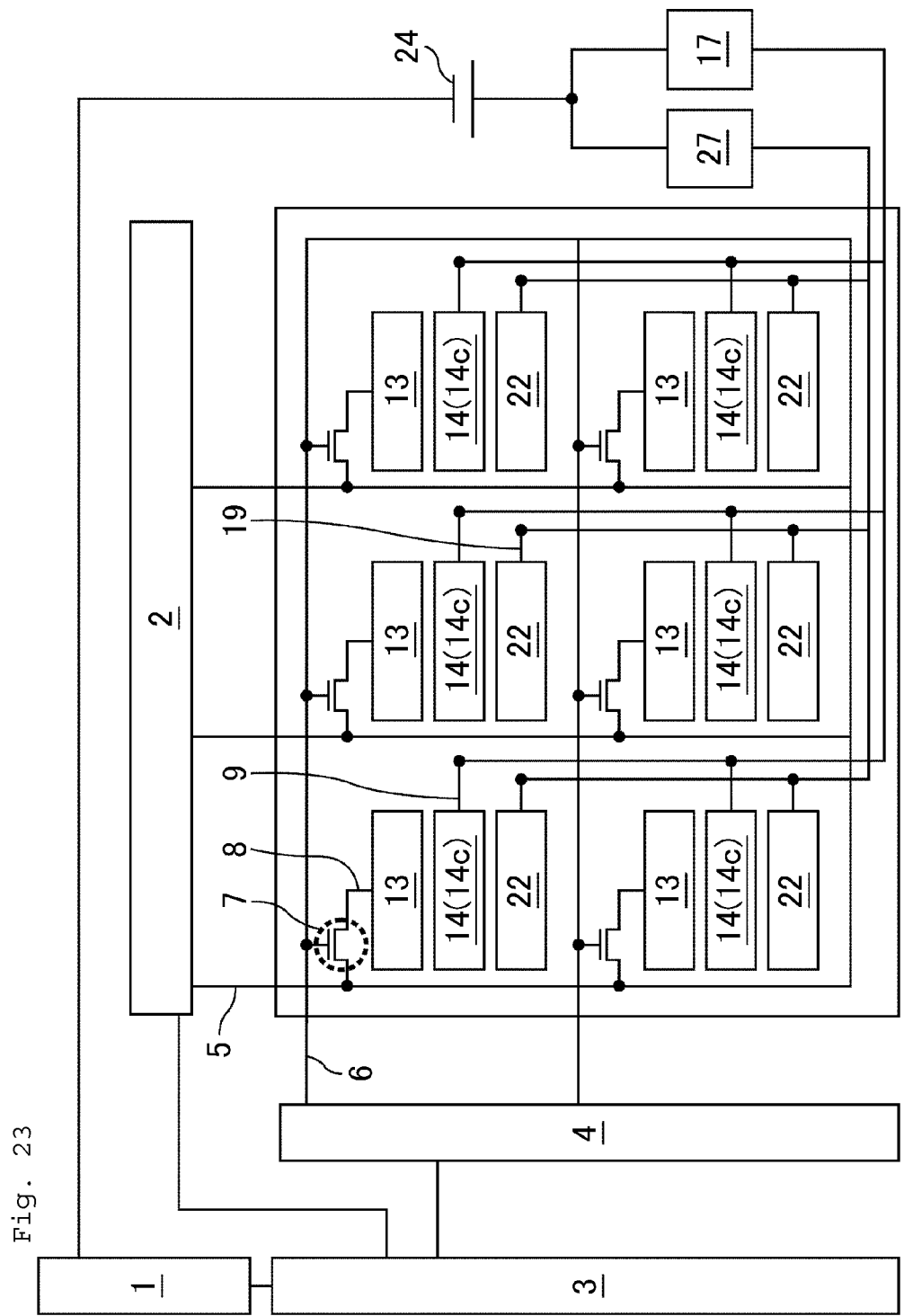
FIG. 23 is a view of a drive circuit in the display device according to the Embodiment 5.

The Embodiment 5 is the same as the Embodiment 4 except that one external battery is installed. FIG. 22 is a schematic sectional view of one pixel in a display device according to the Embodiment 5. FIG. 23 is a view of a drive circuit in the display device according to the Embodiment 5. As illustrated in FIGS. 22 and 23, the second electrode 14 and the third electrode 22 are connected in parallel. The second electrode 14 is connected to the external battery 24 in series via the charge electrode 9 and the rectifier circuit 17. The third electrode 22 is connected to the same external battery 24 in series via the charge electrode 19 and the rectifier circuit 27. The external battery 24 is connected to the power source 1 in the drive circuit. A secondary battery is used as the external battery 24. The type of the secondary battery is not particularly limited.

The configuration as illustrated in FIGS. 22 and 23 enables utilization of the electromotive force which is generated by the movement of the first shutter, used for a part of the power source in the drive circuit. The external battery can be charged with the aid of the vibration from the outside of the display device (environmental vibration) when the display device is turned off. The electric charge accumulated in the external battery can be used as it is as an electromotive force in the power source in the drive circuit when the display device is turned on.

Figure 24:
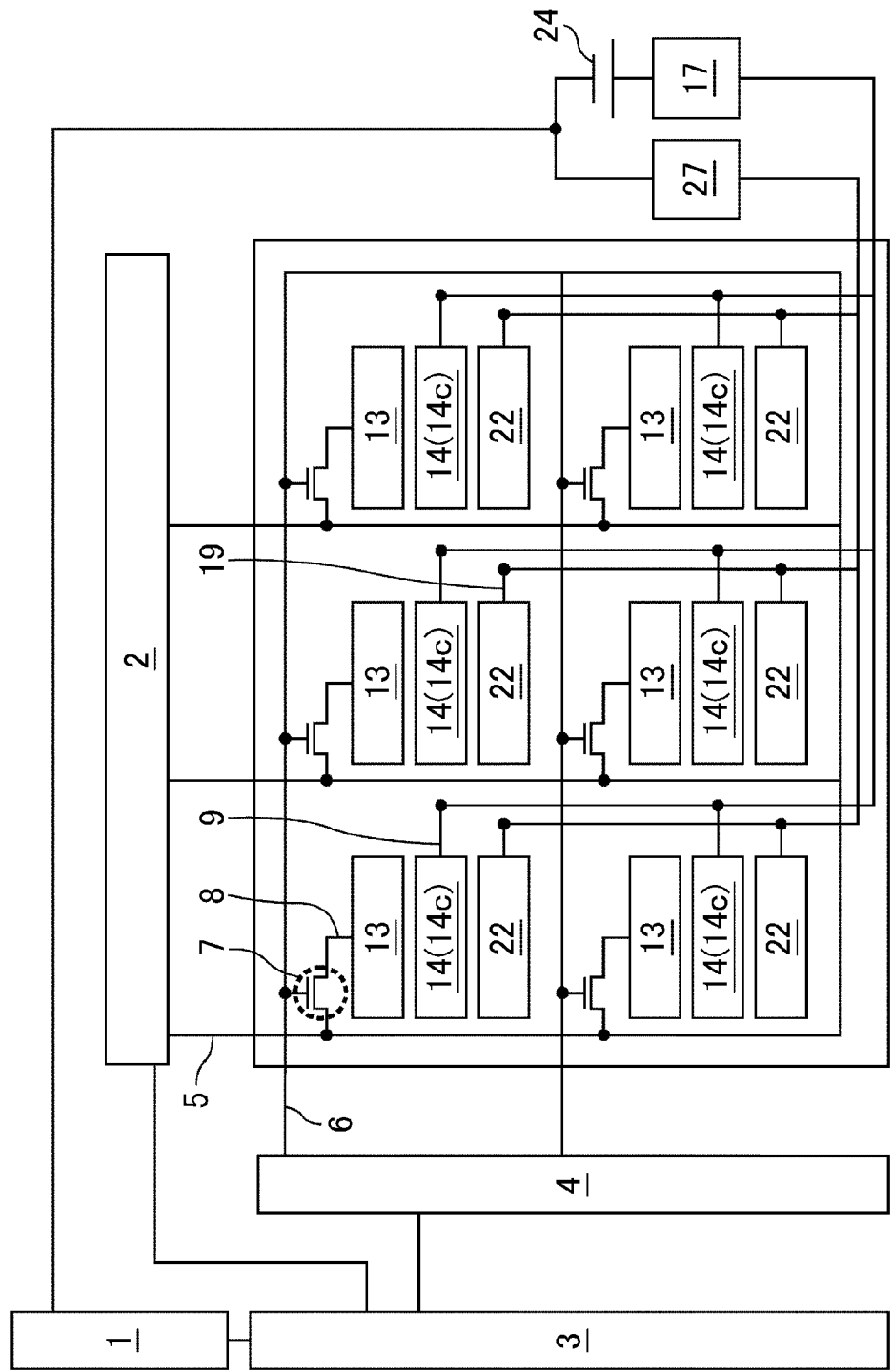
FIG. 24 is a view of a drive circuit in a display device according to the Modified Example 5-1.

A modified example of the Embodiment 5, in which either one of the second electrode and the third electrode is connected to an external battery in series (Modified Example 5-1), is now described as an example. FIG. 24 is a view of a drive circuit in a display device according to the Modified Example 5-1. As illustrated in FIG. 24, the second electrode 14, the charge electrode 9, the rectifier circuit 17, the external battery 24, and the power source 1 are connected in series in the stated order in the Modified Example 5-1. The third electrode 22 is connected to the power source 1 in the drive circuit not via the external battery 24. The third electrode 22 and the external battery 24 may be connected in series in the Modified Example 5-1. In the Modified Example 5-1, the electromotive force which is generated by the movement of the first shutter can be used for a part of the power source in the drive circuit. The external battery can be charged with the aid of the vibration from the outside of the display device (environmental vibration) when the display device is turned off. The electric charge accumulated in the external battery can be used as it is as an electromotive force in the power source in the drive circuit when the display device is turned on.

Figure 25:
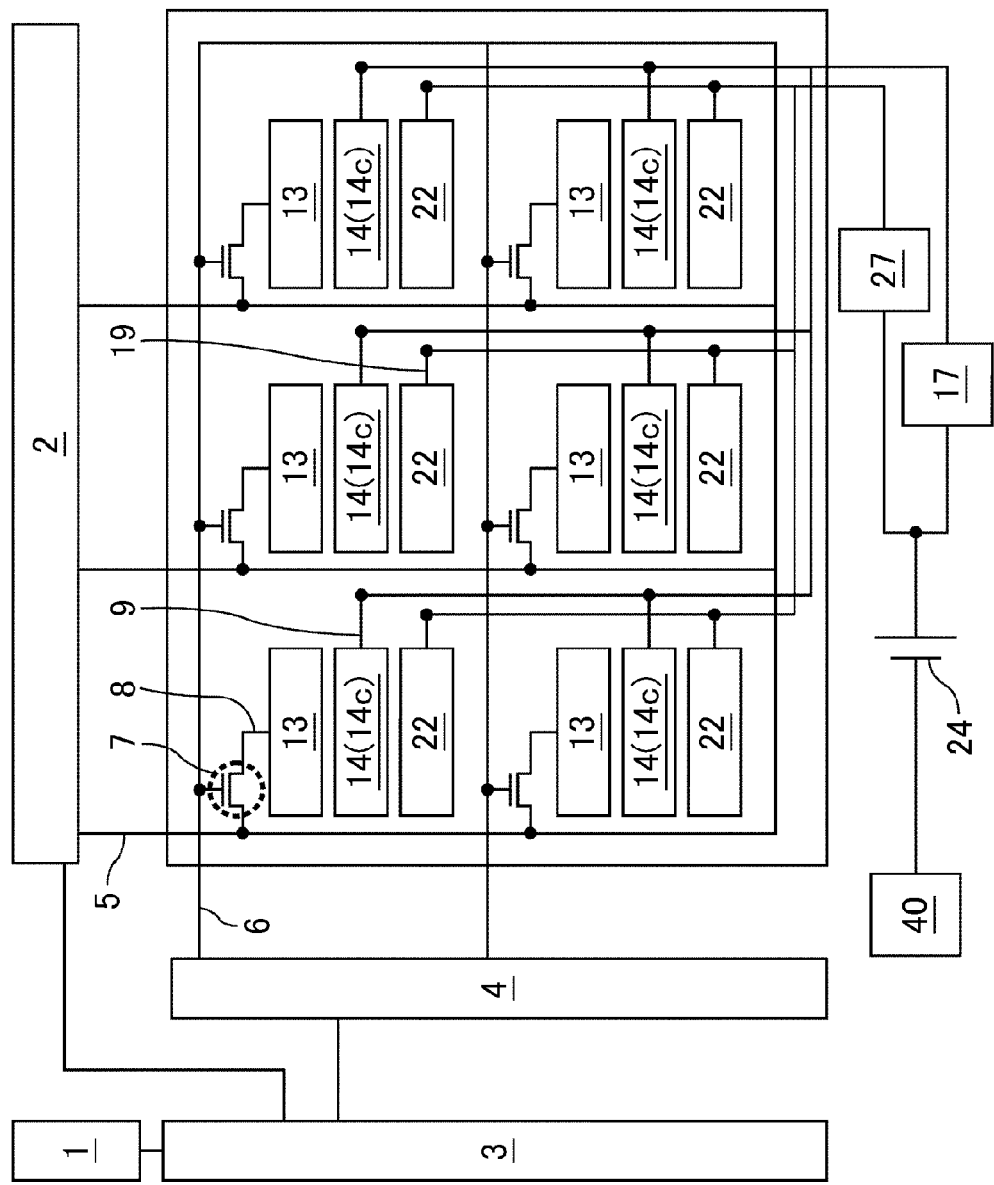
FIG. 25 is a view of a drive circuit in a display device according to the Modified Example 5-2.

Another modified example of the Embodiment 5 in which the second electrode and the third electrode are connected to the light source (Modified Example 5-2) is now described as an example. FIG. 25 is a view of a drive circuit in a display device according to the Modified Example 5-2. As illustrated in FIG. 25, the second electrode 14 and the third electrode 22 are connected in parallel in the Modified Example 5-2. The second electrode 14 is connected to the external battery 24 in series via the charge electrode 9 and the rectifier circuit 17. The third electrode 22 is connected to the same external battery 24 in series via the charge electrode 19 and the rectifier circuit 27. The external battery 24 is connected to the light source 40. In the Modified Example 5-2, the electromotive force which is generated by the movement of the first shutter can be used for a part of the light source. The external battery can be charged with the aid of the vibration from the outside of the display device (environmental vibration) when the display device is turned off. The electric charge accumulated in the external battery can be used as it is as an electromotive force in the light source when the display device is turned on.

Figure 26:
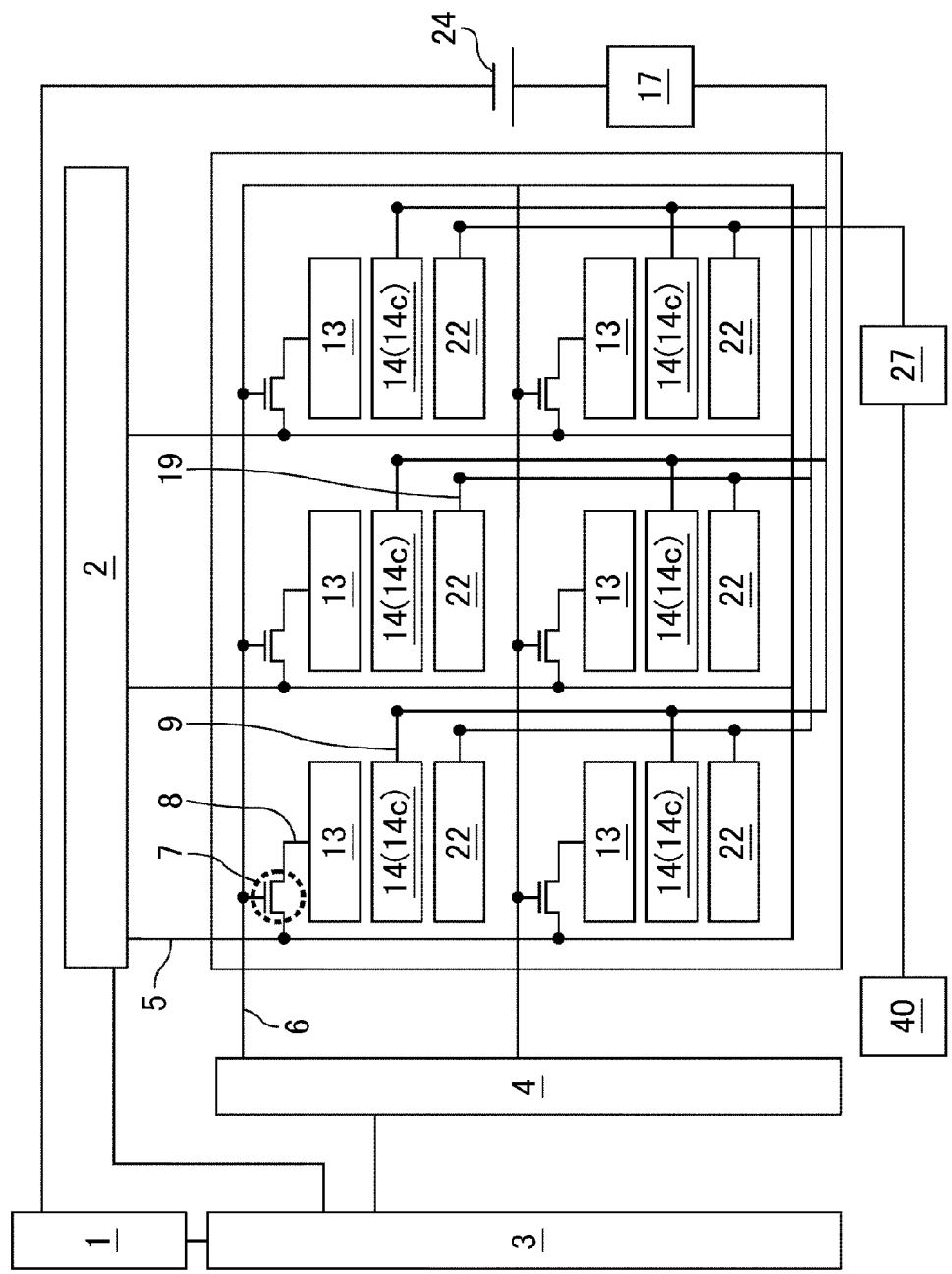
FIG. 26 is a view of a drive circuit in a display device according to the Modified Example 5-3.

Another modified example of the Embodiment 5, in which either one of the second electrode and the third electrode is connected to the power source in the drive circuit, and the other is connected to the light source (Modified Example 5-3), is now described as an example. FIG. 26 is a view of a drive circuit in a display device according to the Modified Example 5-3. As illustrated in FIG. 26, the second electrode 14 is connected to the power source 1 in the drive circuit via the charge electrode 9, the rectifier circuit 17 and the external battery 24 in the Modified Example 5-3. The third electrode 22 is connected to the light source 40 via the charge electrode 19 and the rectifier circuit 27. In the Modified Example 5-3, the third electrode may be connected to the external battery. The second electrode 14 may be connected to the light source 40, and the third electrode 22 may be connected to the power source 1 in the drive circuit. In the Modified Example 5-3, the electromotive force which is generated by the movement of the first shutter can be used for a part of the power source in the drive circuit and the light source. The external battery can be charged with the aid of the vibration from the outside of the display device (environmental vibration) when the display device is turned off. The electric charge accumulated in the external battery can be used as it is as an electromotive force in the power source in the drive circuit and the light source when the display device is turned on.

Thus, in the Embodiment 5, the first shutter slides side to side in response to the switch of the polarity of the electric potential which is supplied to the first electrode, and therefore displaying and power generation can be performed simultaneously, in the same manner as the Embodiment 4. The electromotive force generated can be used for a part of the power source in the drive circuit and/or for a part of the light source. The power consumption can therefore be reduced as a whole display device.

Embodiment 6

Figure 27:
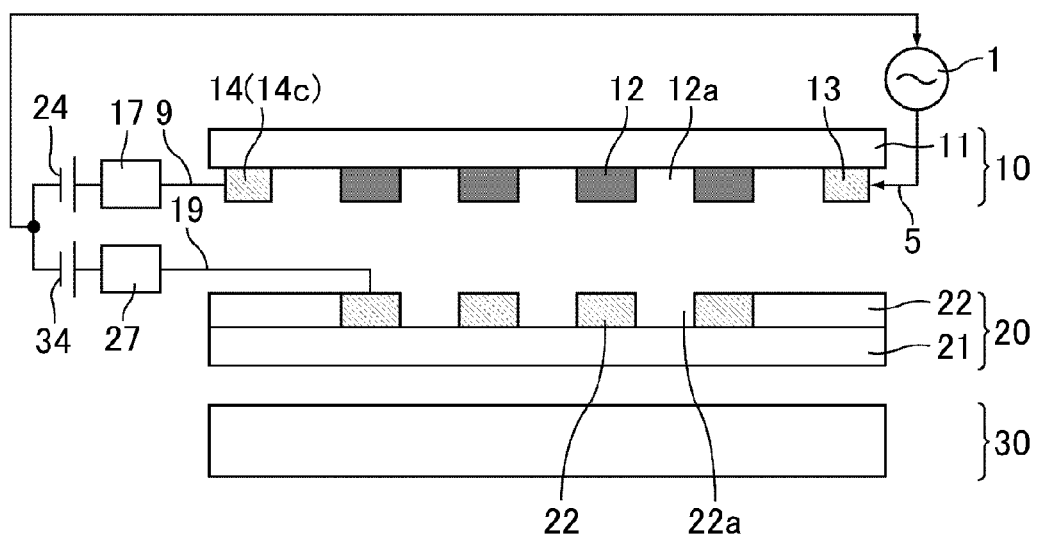
FIG. 27 is a schematic sectional view of one pixel in a display device according to the Embodiment 6.
Figure 28:
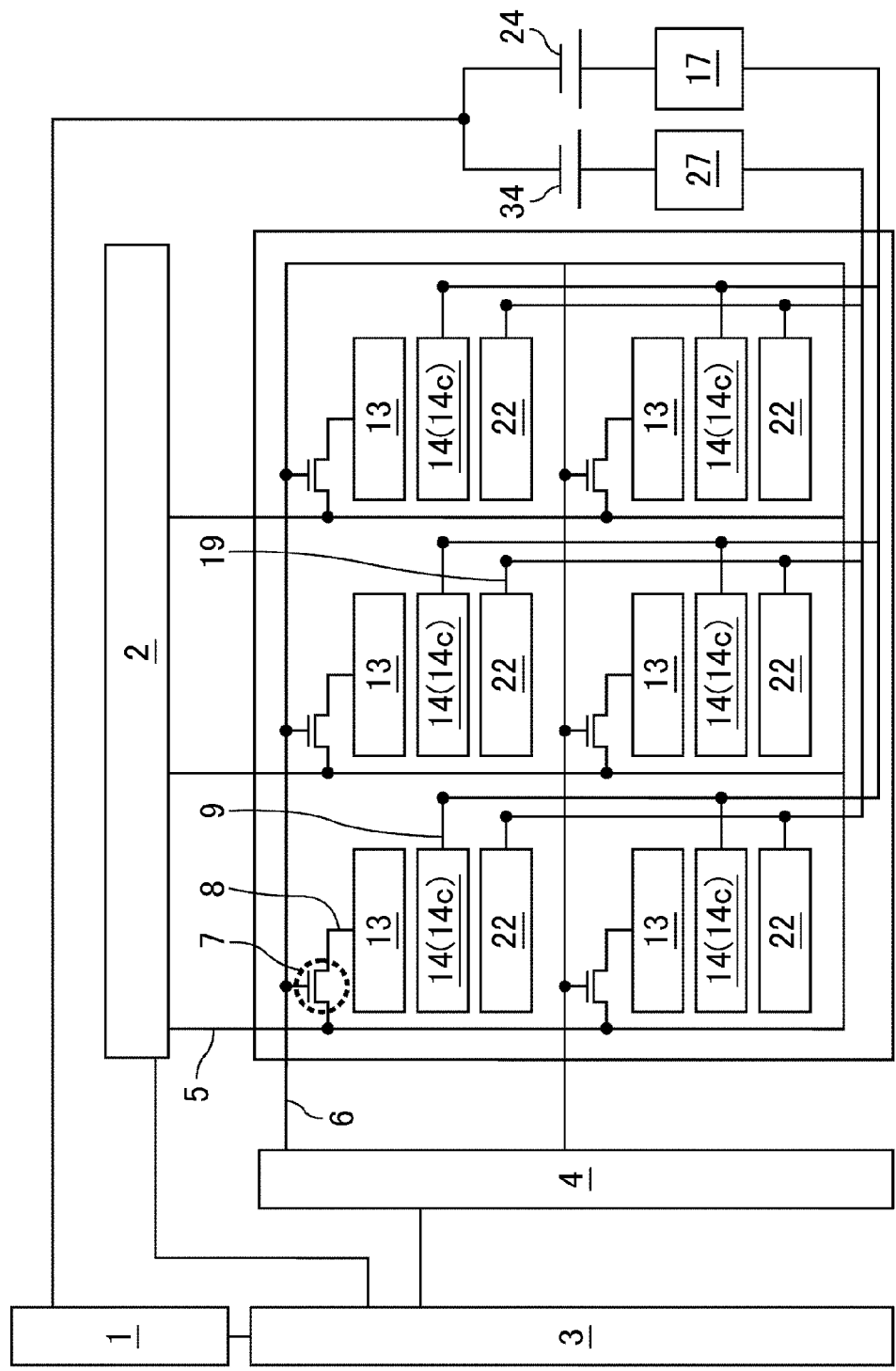
FIG. 28 is a view of a drive circuit in the display device according to the Embodiment 6.

The Embodiment 6 is the same as the Embodiment 4 except that two external batteries (one is referred to as a first external battery, and the other is referred to as a second external battery) are installed. FIG. 27 is a schematic sectional view of one pixel in a display device according to the Embodiment 6. FIG. 28 is a view of a drive circuit in the display device according to the Embodiment 6. As illustrated in FIGS. 27 and 28, the second electrode 14 and the first external battery 24 are connected in series. The third electrode 22 and the second external battery 34 are connected in series. The first external battery 24 and the second external battery 34 are connected in parallel. The second electrode 14, the charge electrode 9, the rectifier circuit 17, the first external battery 24, and the power source 1 are connected in series in the stated order. The third electrode 22, the charge electrode 9, the rectifier circuit 27, the second external battery 34, and the power source 1 are connected in series in the stated order.

The configuration as illustrated in FIGS. 27 and 28 enables utilization of the electromotive force which is generated by the movement of the first shutter, used for a part of the power source in the drive circuit. The external battery can be charged with the aid of the vibration from the outside of the display device (environmental vibration) when the display device is turned off. The electric charge accumulated in the external battery can be used as it is as an electromotive force in the power source in the drive circuit when the display device is turned on.

Figure 29:
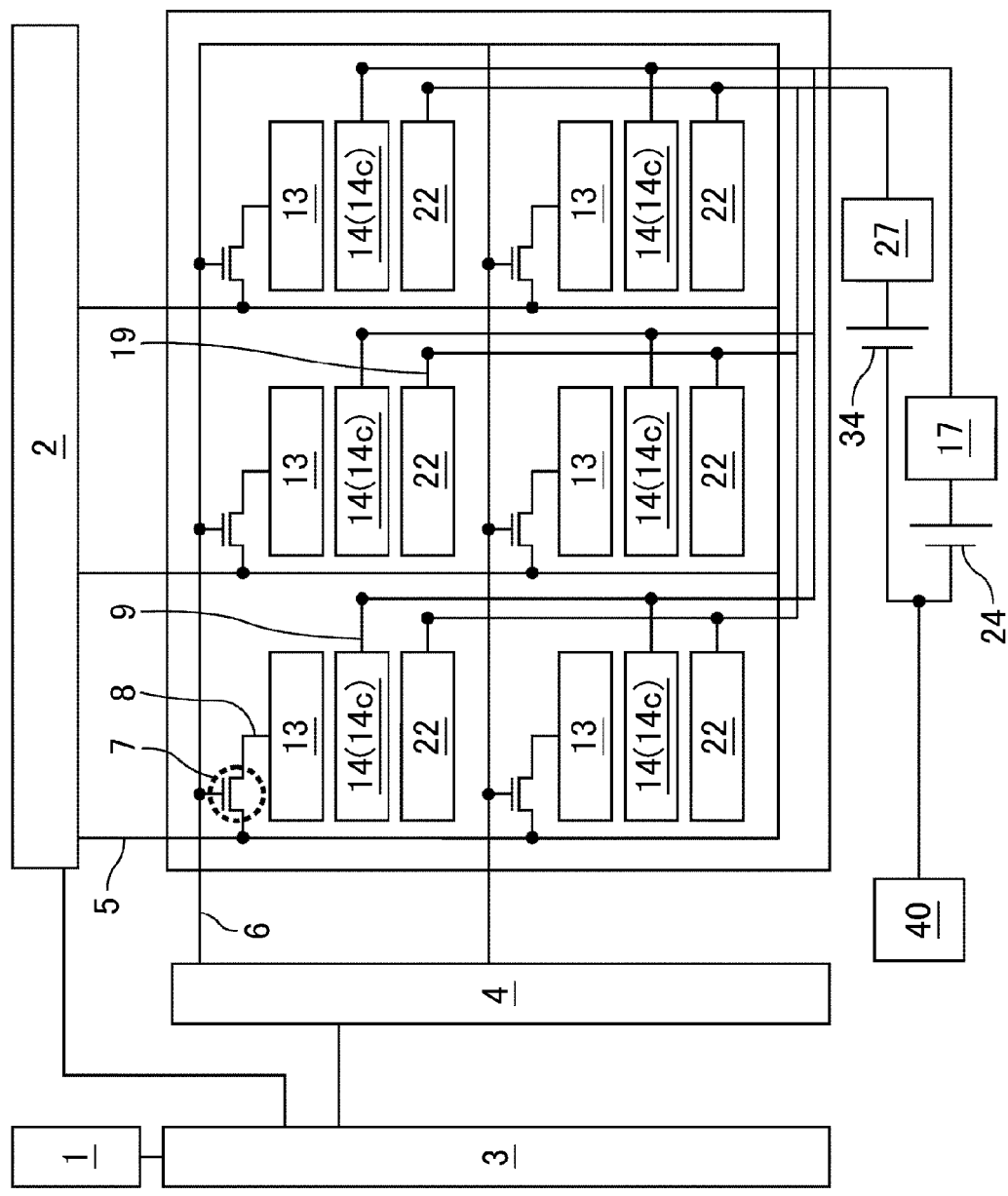
FIG. 29 is a view of a drive circuit in a display device according to the Modified Example 6-1.

A modified example of the Embodiment 6 in which the second electrode and the third electrode are connected to the light source (Modified Example 6-1) is now described as an example. FIG. 29 is a view of a drive circuit in a display device according to the Modified Example 6-1. As illustrated in FIG. 29, the second electrode 14, the charge electrode 9, the rectifier circuit 17, and the first external battery 24 are connected in series in the stated order in the Modified Example 6-1. The third electrode 22, the charge electrode 9, the rectifier circuit 27, and the second external battery are connected in series in the stated order. The first external battery 24 and the second external battery 34 are connected in parallel, and both of them are connected to the light source 40. In the Modified Example 6-1, the electromotive force which is generated by the movement of the first shutter can be used for the light source in the drive circuit. The external battery can be charged with the aid of the vibration from the outside of the display device (environmental vibration) when the display device is turned off. The electric charge accumulated in the external battery can be used as it is as an electromotive force in the light source when the display device is turned on.

Figure 30:
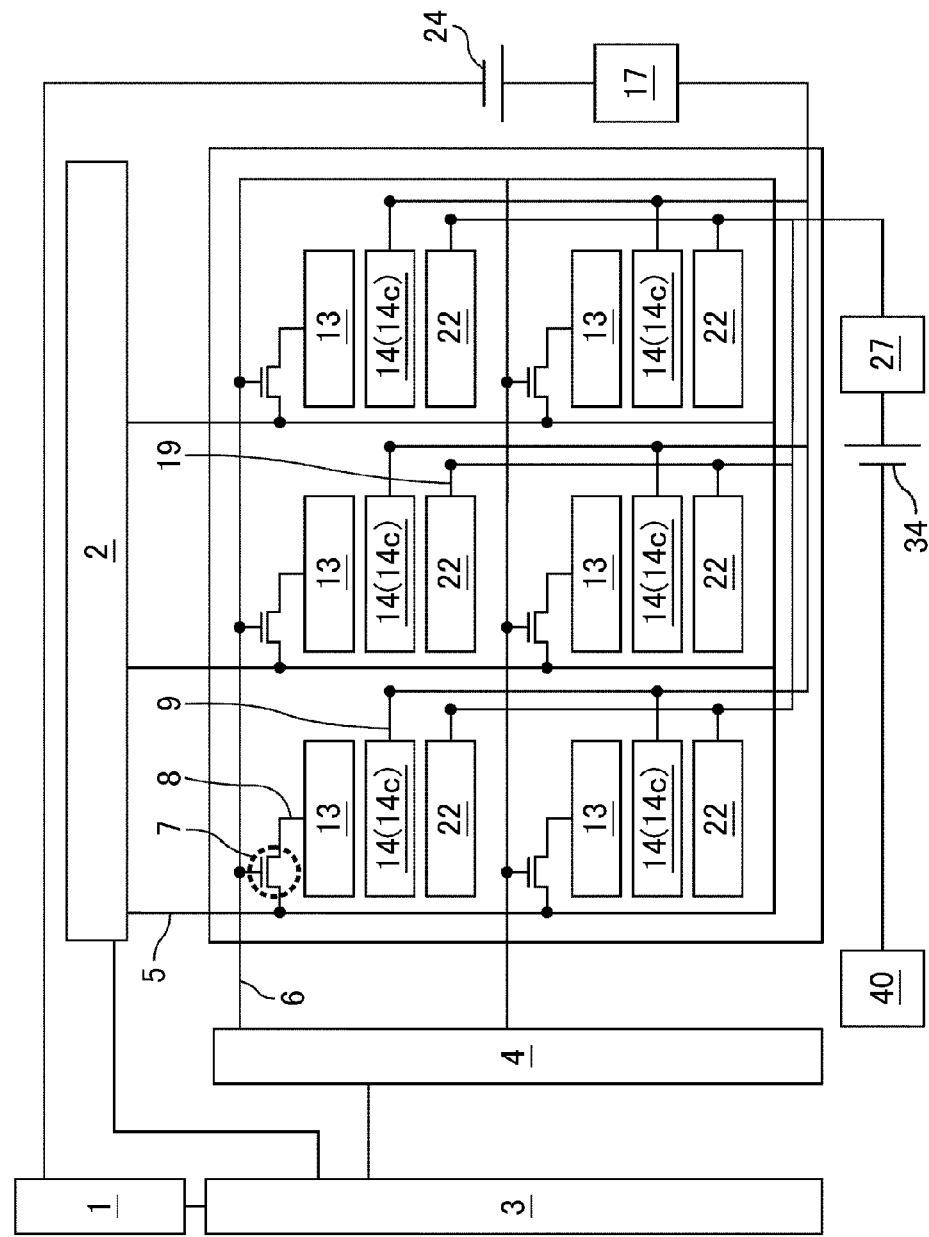
FIG. 30 is a view of a drive circuit in a display device according to the Modified Example 6-2.

Another modified example of the Embodiment 6, in which either one of the second electrode and the third electrode is connected to the power source in the drive circuit, and the other is connected to the light source (Modified Example 6-2), is now described as an example. FIG. 30 is a view of a drive circuit in a display device according to the Modified Example 6-2. As illustrated in FIG. 30, the second electrode 14 is connected to the power source 1 in the drive circuit via the charge electrode 9, the rectifier circuit 17, and the first external battery 24 in the Modified Example 6-2. The third electrode 22 is connected to the light source 40 via the charge electrode 19, the rectifier circuit 27, and the second external battery 34. In the Modified Example 6-2, the second electrode 14 may be connected to the light source 40, and the third electrode 22 may be connected to the power source 1 in the drive circuit. In the Modified Example 6-2, the electromotive force which is generated by the movement of the first shutter can be used for a part of the power source in the drive circuit and the light source. The external battery can be charged with the aid of the vibration from the outside of the display device (environmental vibration) when the display device is turned off. The electric charge accumulated in the external battery can be used as it is as an electromotive force in the power source in the drive circuit or the light source when the display device is turned on.

Thus, in the Embodiment 6, the first shutter slides side to side in response to the switch of the polarity of the electric potential which is supplied to the first electrode, and therefore displaying and power generation can be performed simultaneously, in the same manner as the Embodiment 4. The electromotive force generated can be used for a part of the power source in the drive circuit and/or for a part of the light source. The power consumption can therefore be reduced as a whole display device.

Embodiment 7

Figure 31:
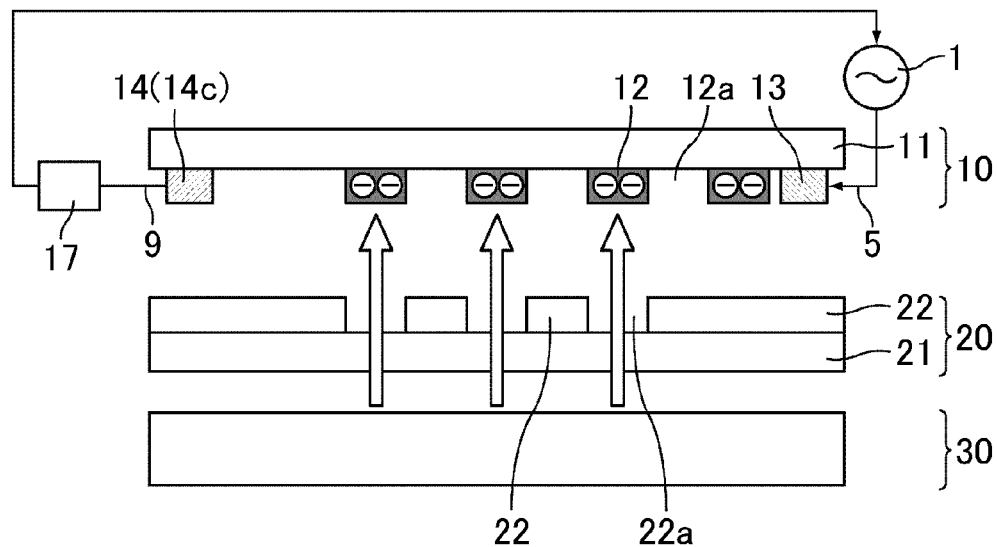
FIG. 31 is a schematic sectional view of one pixel in a display device according to the Embodiment 7 when no voltage is applied.
Figure 32:
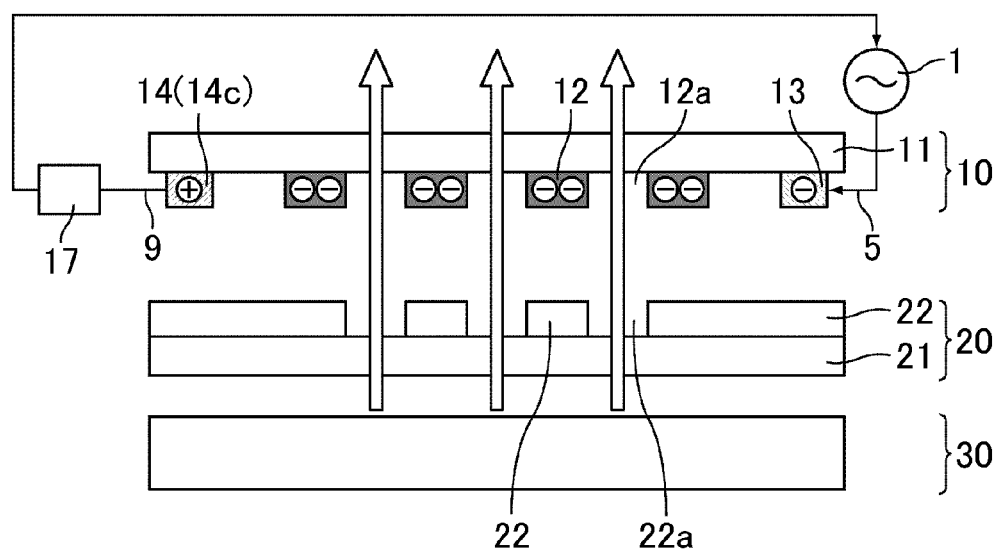
FIG. 32 is a schematic sectional view of one pixel in the display device according to the Embodiment 7 when negative voltage is applied.

The Embodiment 7 is the same as the Embodiment 1 except that the positions of the first shutter and the second shutter are different when black or white color is displayed. FIGS. 31 and 32 are both schematic sectional views of one pixel in a display device according to the Embodiment 7. FIG. 31 illustrates a state when no voltage is applied. FIG. 32 illustrates a state when negative voltage is applied.

When no voltage is applied, the shutter 12 in the display device according to the Embodiment 7 completely overlaps the slit 22a as illustrated in FIG. 31. Then, the shutter 12 shields light emitted from the backlight unit 30. As a result, the gray scale of the pixel shows a display state of the lowest brightness (black color is displayed).

On the contrary, when negative electrical potential is supplied to the first electrode 13, Coulomb's force (repulsive force) is generated between the first electrode 13 and the shutter 12 as illustrated in FIG. 32. Then, as illustrated in FIG. 32, the shutter 12 slides away from the first electrode 13 in a horizontal direction (left direction in FIG. 32). The first elastic body 15 extends by being pulled by the shutter 12. When the slit 12a completely overlaps the slit 22a, light emitted from the backlight unit 30 passes through the thus-overlapped slits 12a and 22a. As a result, the gray scale of the pixel shows a display state of the highest brightness (white color is displayed).

The gray scale is realized by controlling the transmittance of light based on the degree of overlap between the shutter 12 and the slit 22a, or by controlling the transmittance per unit time of light outgoing from the backlight by sliding the shutter 12 at a high speed, in the same manner as the Embodiment 1.

Thus, in the Embodiment 7, the shutter 12 slides side to side, as illustrated in FIGS. 31 and 32, in response to the switch of the polarity of the electric potential which is supplied to the first electrode, and therefore displaying and power generation can be performed simultaneously. The electromotive force generated can be used for a part of the power source in the drive circuit. The power consumption can therefore be reduced as a whole display device.

Embodiment 8

Figure 33:
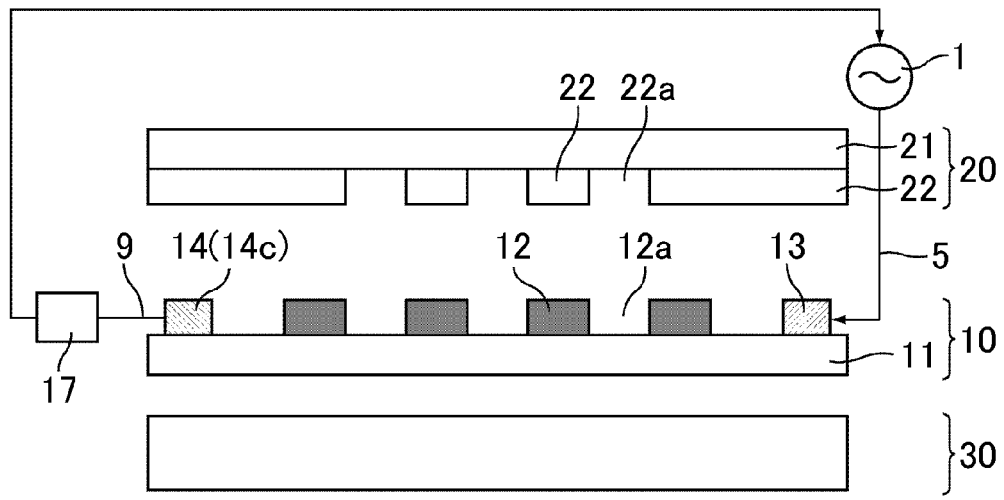
FIG. 33 is a schematic sectional view of one pixel in a display device according to the Embodiment 8.

The Embodiment 8 is the same as the Embodiment 1 except that the arrangement of the first substrate, the second substrate, and the backlight unit is different. FIG. 33 is a schematic sectional view of one pixel in a display device according to the Embodiment 8. As illustrated in FIG. 33, the display device according to the Embodiment 8 includes the second substrate 20, the first substrate 10, and the backlight unit 30 in the stated order from the viewing surface side towards the back surface side.

In the Embodiment 8, the first shutter slides side to side in response to the switch of the polarity of the electric potential which is supplied to the first electrode, and therefore displaying and power generation can be performed simultaneously, in the same manner as the Embodiment 1. The electromotive force generated can be used for a part of the power source in the drive circuit. The power consumption can therefore be reduced as a whole display device.

Embodiment 9

Figure 34:
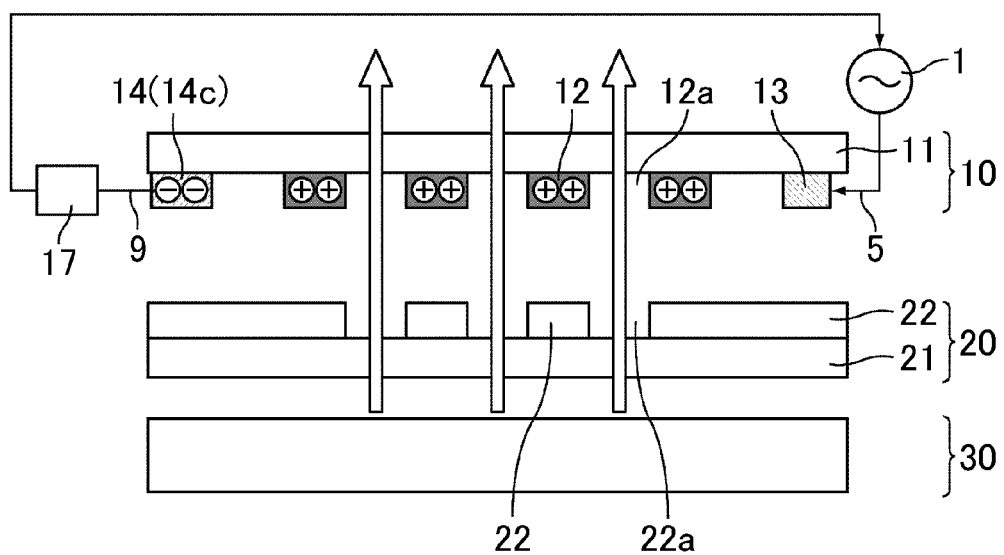
FIG. 34 is a schematic sectional view of one pixel in a display device according to the Embodiment 9 when no voltage is applied.
Figure 35:
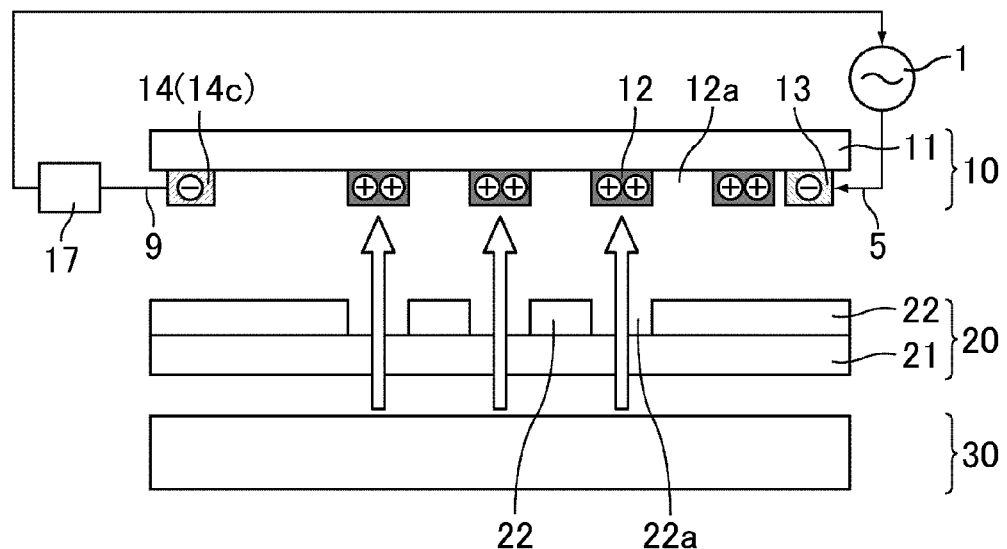
FIG. 35 is a schematic sectional view of one pixel in the display device according to the Embodiment 9 when negative voltage is applied.

The Embodiment 9 is the same as the Embodiment 1 except that the first slit is positively charged, and the first slit slides side to side by an attractive force between the first slit and the first electrode. FIGS. 34 and 35 are both schematic sectional views of one pixel in a display device according to the Embodiment 9. FIG. 34 illustrates a state when no voltage is applied. FIG. 35 illustrates a state when negative voltage is applied.

When no voltage is applied, the slit 12a completely overlaps the slit 22a as illustrated in FIG. 34. Light emitted from the backlight unit 30 passes through the thus-overlapped slits 12a and 22a. As a result, the gray scale of the pixel shows a display state of the highest brightness (white color is displayed). In the Embodiment 9, the first slit is positively charged.

On the contrary, when negative electrical potential is supplied to the first electrode 13, Coulomb's force (attractive force) is generated between the first electrode 13 and the shutter 12 as illustrated in FIG. 35. Then, as illustrated in FIG. 35, the shutter 12 slides to approach the first electrode 13 in a horizontal direction (right direction in FIG. 35). Then, the second elastic body 16 extends by being pulled by the shutter 12. When the shutter 12 completely overlaps the slit 22a, the shutter 12 shields light emitted from the backlight unit 30. As a result, the gray scale of the pixel shows a display state of the lowest brightness (black color is displayed).

When the shutter 12 slides in a right direction, the shutter 12 goes apart from the second electrode 14, which doubles as a support for the shutter 12, and electrostatic induction is caused. Thus, negative electric charge on the second electrode 22 decreases by the electrostatic induction.

Then, when the polarity of the electric potential which is supplied to the first electrode 13 is switched, the shutter 12 returns to the original position by the restoring force of the second elastic body 16.

The amount of the electric charge on the second electrode 14 changes as the distance between the shutter 12 and the second electrode 14 varies, and thus electric current flows into the charge electrode 9. The charge electrode 9 is connected to the power source 1 in the drive circuit via the rectifier circuit 17 or the like. Thus, the electromotive force generated can be used for a part of the power source in the drive circuit.

In the Embodiment 9, the first shutter slides side to side in response to the switch of the polarity of the electric potential which is supplied to the first electrode, and therefore displaying and power generation can be performed simultaneously, in the same manner as the Embodiment 1. The electromotive force generated can be used for a part of the power source in the drive circuit. The power consumption can therefore be reduced as a whole display device.

Embodiment 10

Figure 36:
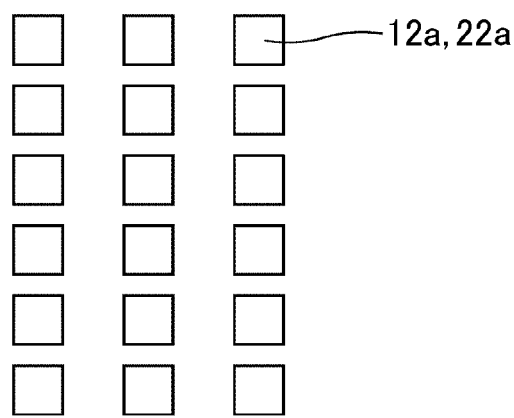
FIG. 36 illustrates an example of a first slit and a second slit in a display device according to the Embodiment 10.

The Embodiment 10 is the same as the Embodiment 1 except that the shapes of the first slit and the second slit are different. FIG. 36 illustrates an example of a first slit and a second slit in a display device according to the Embodiment 10.

As illustrated in FIG. 36, one first slit 12a is in a square shape in the display device according to the Embodiment 10. A plurality of the slits 12a arrange in one direction to form one line. A plurality of lines each of which are the same as the above one line of the slits 12a are disposed, and the plurality of lines are arranged in the direction perpendicular to the longitudinal direction of the one line in parallel with each other. One line of the plurality of lines corresponds to the rectangular slit 12a in the Embodiment 1, and displaying is performed by transmitting or shielding light emitted from the backlight unit.

The second slit 22a has the same configuration as the first slit 12a, and thus, one second slit 22a is in a square shape. A plurality of the slits 22a arrange in one direction to form one line. A plurality of lines each of which are the same as the above one line of the slits 22a are disposed, and the plurality of lines are arranged in the direction perpendicular to the longitudinal direction of the one line in parallel with each other. One line of the plurality of lines corresponds to the rectangular slit 22a in the Embodiment 1, and displaying is performed by transmitting or shielding light emitted from the backlight unit.

In the Embodiment 10, both the first slit and the second slit may have a structure in which each slit is in a square shape. It is also possible for the first slit and the second slit to have a structure in which each slit of either one of the first slit and the second slit is in a square shape, and that of the other is in a rectangular shape such as described in the Embodiment 1.

In the Embodiment 10, the first shutter slides side to side in response to the switch of the polarity of the electric potential which is supplied to the first electrode, and therefore displaying and power generation can be performed simultaneously, in the same manner as the Embodiment 1. The electromotive force generated can be used for a part of the power source in the drive circuit. The power consumption can therefore be reduced as a whole display device.

Thus, the Embodiments 1 to 10 and modified examples thereof were described as above. The Embodiments 1 to 10 and modified examples thereof may be appropriately combined as long as they are compatible.

REFERENCE SIGNS LIST

1: Power source in the drive circuit
2: Source driver
3: Display controlling circuit
4: Gate driver
5: Source wiring
6: Gate wiring
7: TFT
8: Drain wiring
9, 19: Charge electrode
10: First substrate
11, 21: Transparent substrate
12: First shutter
12a: First slit
13: First electrode
14: Second electrode
14a, 14b, 14c: Support
15: First elastic body
16: Second elastic body
17, 27: Rectifier circuit
20: Second substrate
22: Second shutter, third electrode
22a: Second slit
23: Spacer 24, 34: External battery
30: Backlight unit
40: Light source

The invention claimed is:

1. A display device equipped with a power generation function comprising:
   a first substrate including a movable electret first shutter with a first slit, a first electrode, and a second electrode on a side opposite to the first electrode with the first shutter between the first electrode and the second electrode;
   a second substrate including a second shutter with a second slit;
   a drive circuit connected to the first electrode to actuate the first shutter;
   a light source; and
   a rectifier circuit between the second electrode and the light source; wherein
   the first shutter is positively or negatively charged;
   the second electrode is connected to at least one of the drive circuit and the light source;
   electrostatic induction caused by movement of the first shutter generates an electromotive force on the second electrode; and
   the electromotive force is used to power the drive circuit and/or the light source.

2. The display device equipped with the power generation function according to claim 1, wherein a longitudinal direction of the first slit and a longitudinal direction of the second slit are in parallel with each other.

3. The display device equipped with the power generation function according to claim 1, wherein the first shutter is moved with aid of an electrostatic force generated between the first shutter and the first electrode.

4. The display device equipped with the power generation function according to claim 1, further comprising a rectifier circuit between the second electrode and the drive circuit.

5. The display device equipped with the power generation function according to claim 1, wherein an amount of light emitted from the light source and passing through the display device is adjusted by the first shutter and the second shutter.

6. A display device equipped with a power generation function comprising:
   a first substrate including a movable electret first shutter with a first slit, a first electrode, and a second electrode on a side opposite to the first electrode with the first shutter between the first electrode and the second electrode;
   a second substrate including a second shutter with a second slit;
   a drive circuit connected to the first electrode to actuate the first shutter;
   a light source;
   an external battery connected to the second electrode; and
   a rectifier circuit between the second electrode and the external battery, wherein
   the first shutter is positively or negatively charged,
   the second electrode is connected to at least one of the drive circuit and the light source,
   electrostatic induction caused by movement of the first shutter generates an electromotive force on the second electrode,
   the electromotive force is used to power the drive circuit and/or the light source, and
   the second electrode and the external battery are connected in series.

7. A display device equipped with a power generation function comprising:
   a first substrate including a movable electret first shutter with a first slit, a first electrode, and a second electrode on a side opposite to the first electrode with the first shutter between the first electrode and the second electrode;
   a second substrate including a second shutter with a second slit;
   a drive circuit connected to the first electrode to actuate the first shutter;
   a light source; and
   an external battery, wherein
   the first shutter is positively or negatively charged,
   the second electrode is connected to at least one of the drive circuit and the light source,
   electrostatic induction caused by movement of the first shutter generates an electromotive force on the second electrode,
   the electromotive force is used to power the drive circuit and/or the light source,
   the second electrode and the external battery are connected in series,
   the external battery is connected to the drive circuit, and
   the external battery is a secondary battery.

8. A display device equipped with a power generation function comprising:
   a first substrate including a movable electret first shutter with a first slit, a first electrode, and a second electrode on a side opposite to the first electrode with the first shutter between the first electrode and the second electrode;
   a second substrate including a second shutter with a second slit;
   a drive circuit connected to the first electrode to actuate the first shutter;
   a light source; and
   an external battery, wherein
   the first shutter is positively or negatively charged;
   the second electrode is connected to at least one of the drive circuit and the light source,
   electrostatic induction caused by movement of the first shutter generates an electromotive force on the second electrode,
   the electromotive force is used to power the drive circuit and/or the light source,
   the second electrode and the external battery are connected in series,
   the external battery is connected to the light source, and
   the external battery is a secondary battery.

* * * * *